US007982842B2

(12) United States Patent

Kawaura et al.

(10) Patent No.: US 7,982,842 B2

(45) Date of Patent: Jul. 19, 2011

(54) INTERCONNECT STRUCTURE FOR DISPLAY DEVICE AND PROJECTION DISPLAY APPARATUS

(75) Inventors: Hideaki Kawaura, Kanagawa (JP); Koichi Katagawa, Kanagawa (JP); Hiroshi Sata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1048 days.

(21) Appl. No.: 11/622,565

(22) Filed: Jan. 12, 2007

(65) Prior Publication Data

US 2007/0171216 A1 Jul. 26, 2007

(30) Foreign Application Priority Data

Jan. 17, 2006 (JP) ................................ 2006-009004
Dec. 13, 2006 (JP) ................................ 2006-336059

(51) Int. Cl.
*G02F 1/1345* (2006.01)
*G09G 5/00* (2006.01)

(52) U.S. Cl. ......... 349/149; 349/150; 349/152; 345/204

(58) Field of Classification Search .................. 349/149, 349/150, 152; 345/204
See application file for complete search history.

(56) References Cited

U.S. PATENT DOCUMENTS

2005/0110731 A1* 5/2005 Tajiri et al. ...................... 345/87
2005/0259038 A1* 11/2005 Otsuka et al. .................. 345/60
2006/0017716 A1* 1/2006 Aoki ............................ 345/204

* cited by examiner

*Primary Examiner* — Michael H Caley
(74) *Attorney, Agent, or Firm* — SNR Denton US LLP

(57) ABSTRACT

An interconnect structure for a display device includes a driver from which display data are supplied, and an interconnect material having a plurality of signal lines disposed in parallel through which the display data are supplied from the driver. In the interconnect structure for a display device, the signal lines from which the display data are transmitted via the interconnect material are rearranged such that the display data via the signal lines having a comparatively larger effect of the inductance components and the display data via the signal lines having a comparatively smaller effect of the inductance components in the interconnect material are alternately supplied to adjacent pixels or groups of pixels of the display device. As a result, an image is displayed based on the luminance suitable for the display data.

12 Claims, 14 Drawing Sheets

INTERCONNECT STRUCTURE FOR DISPLAY DEVICE AND PROJECTION DISPLAY APPARATUS

CROSS REFERENCES TO RELATED APPLICATIONS

The present application contains subject matter related to Japanese Patent Application JP 2006-009004 filed in the Japanese Patent Office on Jan. 17, 2006, and Japanese Patent Application JP 2006-336059 filed in the Japanese Patent Office on Dec. 13, 2006, the entire contents of which being incorporated herein by reference.

BACKGROUND OF THE INVENTION

1. Field of the Invention

The present invention relates to an interconnect structure for display device to which a driver is externally attached. The present invention also relates to a projection display apparatus (projection system) in which the interconnect structure is applied to an optical modulation device.

2. Description of the Related Art

In recent years, much attention has been attracted to a reflection-type device capable of realizing reduction in size and high resolution and exhibiting high light use efficiency, and the reflection-type device has been practically used as a display device with a progress in higher resolution, smaller size and higher luminance of the projection system. The reflection-type device implies an active type reflective liquid crystal display device which includes a glass substrate on which transparent electrodes are formed facing a drive substrate formed of a silicon substrate on which a CMOS semiconductor circuit is formed, with liquid crystal being injected between the two substrates. Pixel electrodes are placed on the drive substrate in a matrix form for reflecting light and applying voltages to the liquid crystal. The pixel electrode generally includes a metallic material containing aluminum as a major component that is used for LSI processing.

In the reflective liquid crystal display device, a potential difference is generated between a transparent electrode and a pixel electrode by writing display data (signal voltages) in the pixel electrode so that the voltage is applied to the liquid crystal. At this point, optical properties of the liquid crystal vary with the potential difference between the electrodes, and luminance of the liquid crystal is changed by modulating the incident light. Generally, writing in the pixel electrode is performed sequentially from any one of four corners in the display region by controlling a switching element on a pixel drive circuit located at an intersection of a gate line in a row direction and a data line in a column direction.

A driver IC that generates display data is externally attached to the reflective liquid crystal display device for reducing size of the projection system. Further, the display data are supplied from the driver IC through a flexible print circuit (FPC).

The signal voltage written in the pixel electrode is retained by an auxiliary capacity in the pixel drive circuit for one frame (e.g., for approximately 16.7 ms) until next writing begins. Further, since applying the DC voltage to the liquid crystal may deteriorate the device, the equal amount of plus or minus voltage is alternately applied to the liquid crystal for each frame. An organic or inorganic material is used for an alignment layer in the reflective liquid crystal display devices. Higher luminance, higher resolution and higher definition have been expected to be realized in the reflective liquid crystal display device and the projection system using this reflective liquid crystal display device.

In this type of a reflective liquid crystal display device, the display data supplied from the driver IC through the flexible print circuit have been transmitted to and written in the pixel electrodes with an original arrangement (e.g., see Japanese Unexamined Patent Publication No. 2005-189758, paragraph numbers [0008] to [0016], [0052] to [0058], FIG. 9, FIG. 1).

The transmission of the display device in the related art shall be described by referring to a reflective liquid crystal display device with a dot sequential drive system as an example. In the dot sequential drive system, adjacent n pixels as a unit on a gate line are sequentially written by sequentially supplying the display data to n line(s) of data lines (n is an integer of one or two or more) while scanning the gate lines per line. When completing writing in the final row of the data lines, writing is repeated in the similar order while scanning the next line of the gate lines.

FIG. 1 is a diagram showing one example of an interconnect structure for a reflective liquid crystal display device with a dot sequential drive system in the related art. In the reflective liquid crystal display device, gate lines X in the row direction and data lines Y in the column direction are arranged in a matrix form on a drive substrate 71 and a pixel (pixel drive circuit and pixel electrode) P is disposed at an intersection of the gate line X and data line Y.

The external driver IC 61 is provided with a substrate 62 other than that used in the reflective liquid crystal display device. The substrate 62 is connected with the drive substrate 71 in the reflective liquid crystal display device via the FPC (Flexible Print Circuit) 51. Display data D1 to D5 (signal voltage), each with five pixels, are respectively outputted from the output terminals 61*a* to 61*e* of the driver IC 61. The display data D1 to D5 are transmitted to the FPC 51 via five signal lines 62*a* to 62*e* formed on the substrate 62 and supplied to the drive substrate 71 via five signal lines 51*a* to 51*e* disposed in parallel in the FPC 51.

The control signal C is supplied from an external timing control circuit to the drive substrate 71 via the FPC (Flexible Print Circuit) 51 (not shown).

Five signal lines 71*a* to 71*e* are formed on the drive substrate 71 for transmitting the display data D1 to D5 supplied to the drive substrate 71. The signal lines 71 to 71*e* are disposed in parallel and the display data D1 to D5 are transmitted to the data line driver 73 with the same arrangement of the signal lines 51*a* to 51*e* of the FPC 51. All the display data D1 to D5 are supplied to the four respective change-over switches 74 to 77 in the data line driver 73.

The control signal C supplied to the drive substrate 71 is supplied to the gate line driver 79 and the data line driver 73.

The gate line driver 79 scans the gate line X based on the control signal C. In the data line drivers 73, the switching control circuit 78 controls the change-over switches 74 to 77 based on the control signal C.

As indicated by an arrow in the figure, the following shows operations of the dot sequential drive system in a case where the gate lines X are scanned from the lower end to the upper end in the display region, and the data lines Y are switched from the right end to left end in the display region.

First, the display data D1 to D5 are supplied to the five data lines Y at the right side by switching on the change-over switch 77 alone using the switching control circuit 78 in the data line driver 73 while the gate line driver 79 scans the lowest row of the gate line X. Thus, the adjacent five pixels P at the right side in the lowest row are written.

Subsequently, the display data D1 to D5 are supplied to the five data lines Y at the slightly right side of the center by switching on the change-over switch 76 alone using the switching control circuit 78 in the data line driver 73 while the gate line driver 79 scans the lowest row of the gate lines. Thus, the adjacent five pixels P at the slightly right side of the center in the lowest row are written.

The display data D1 to D5 are supplied to the five data lines Y at the slightly left side of the center by switching on the change-over switch 75 alone using the switching control circuit 78 in the data line driver 73 while the gate line driver 79 scans the lowest row of the gate lines. Thus, the adjacent five pixels P at the slightly left side of the center in the lowest row are written.

The display data D1 to D5 are supplied to the five data lines Y at the left side by switching on the change-over switch 74 alone using the switching control circuit 78 in the data line driver 73 while the gate line driver 79 scans the lowest row of the gate lines. Thus, the adjacent five pixels P at the left side in the lowest row are written.

Subsequent to writing the pixels in the lowest row, the gate line in the second from the lowest row is scanned in the similar order. Writing is repeated in the similar order while scanning the gate lines per line in the upper direction.

SUMMARY OF THE INVENTION

A plurality of the signal lines in the flexible print circuit includes inductance components, which each of which causes counter electromotive force with current flowing from the driver IC. If the length of the flexible print circuit is several tens of millimeters, the effect of the inductance components becomes too large to be disregarded.

If a rigid type multilayer substrate is used, the effects of the inductance components on the respective signal lines are uniformly reduced using a whole layer as a ground layer (grounding for signals, i.e., a return circuit of electric current).

However, if a flexible print circuit is used, the number of ground lines used as grounding for signals is generally limited. For example, only two ground lines are provided at both ends or only three ground lines are provided at both ends and the center of the flexible print circuit. Accordingly, the effect of the inductance components on respective signal lines may be different depending on the positions relative to the ground lines, or significance in the effect may gradually change between the mutually adjacent signal lines.

FIG. 2A shows distribution representing significance in the effect of the inductance components on respective signal lines 51*a* to 51*e* in a case where the FPC 51 in FIG. 1 includes two ground lines located at both ends. The effect of the inductance components on the signal lines gradually becomes larger in the order of the signal lines 51*a*, 51*b*, and 51*c* located closer positions from the end of the FPC 51; and the effect on the signal lines gradually becomes smaller in the order of the signal lines 51*c*, 51*d*, and 51*e* located closer positions from the end of the FPC 51. Thus, the distribution includes one positive peak.

As shown in FIG. 2B, due to the inconsistent effect of the inductance components, distribution represents the display data D1 to D5 supplied to adjacent five pixels P1 to P5 described as follows:

the levels of voltage gradually increase in the order of the display data D1 supplied to the pixel P1 at the left end, the display data D2 supplied to the pixel P2 at the second position from the left, and the display data D3 supplied to the pixel P3 at the center; and the levels of voltage gradually decrease in the order of the display data D3 supplied to the pixel P3, the display data D4 supplied to the pixel P4 at the second position from the right end, and the display data D5 supplied to the pixel P5 at the right end. Thus, the distribution includes one positive peak.

The luminance varies with the varied levels of the display data in the reflective liquid crystal display device using an analog drive system. Consequently, as shown in FIG. 3, a luminance non-uniformity patterns with vertical stripes repeatedly appearing light or dark luminance is observed, each of which includes the horizontal width of five pixels.

FIG. 1 shows an example of writing five pixels as a unit for convenience of illustrating figures; however, in practice, the larger number of pixels such as adjacent 24 pixels as a unit may be written in the reflective liquid crystal display device with a dot sequential drive system. As a result, a luminance non-uniformity pattern having a longer spatial period (i.e., a low spatial frequency) that appears the horizontal width of 24 pixels as a unit may be observed. Such a luminance non-uniformity pattern having a low spatial frequency can be observed with human eyes.

In recent years, due to a reduction in size and weight and higher integration of the elements of the flexible print circuit, there appears an increase in the frequency of the display data and a decrease in the distance between the signal lines. Accordingly, the inconsistent effect of the inductance components on such a flexible print circuit may be factors in deteriorating image quality. This inconsistency becomes apparent in a case where current drive capability in the driver IC is low and the flexible print circuit is long in length. It is not desirable to increase the current drive capability of the driver IC in view of costs. In addition, there arise some limitations of the places on the drive substrate where connectors are connected with the flexible print circuit in the reflective liquid crystal display device due to increased performance of the driver IC. Thus, it is difficult to use shorter interconnect in the flexible print circuit.

It should be noted that the non-uniform luminance due to the inconsistent effects of the inductance components has a common problem, not only with reflective liquid crystal display devices, but also with analog drive system display devices (such as liquid crystal display device, field electron emission display (FED) devices, organic EL display devices, and inorganic EL display devices). Further, if using a display device to which PAM (Pulse-Amplitude Modulated) display data are supplied, the luminance varies with the varied levels of the display data, thus still remaining the same problem.

Furthermore, the inconsistent effects of the inductance components can be observed in a interconnect material (e.g., flexible flat cable (FFC)) other than the flexible print circuit when using the interconnect material having a plurality of signal lines disposed in parallel.

According to an embodiment of the present invention, the luminance non-uniformity due to the inconsistent effects of the inductance components in the interconnect material can little be observed or cannot be observed with the human eyes without changing the current drive capability of the driver or the length of the interconnect material in a case where the display data are supplied from the driver to the display device via the interconnect material having the plurality of signal lines disposed in parallel.

According to an embodiment of the present invention, an interconnect structure for display device includes an interconnect material having a plurality of signal lines disposed in parallel through which the display data are supplied from the driver. Further, according to the embodiment of the present invention, an interconnect structure for display device which can display an image having luminance suitable for the display data includes signal lines from which the display data are transmitted via the interconnect material are rearranged such that the display data via the signal lines having a comparatively larger effect of the inductance components and the display data via the signal lines having a comparatively smaller effect of the inductance components in the interconnect material are alternately supplied to adjacent pixels or groups of pixels of the display device.

Further, in the interconnect structure according to an embodiment of the present invention, the plurality of the signal lines used for the display data transmitted via the interconnect material are rearranged such that the display data via the signal lines having a comparatively larger effect of the inductance components in the interconnect material and the display data via the signal lines having a comparatively smaller effect of the inductance components in the interconnect material are alternately supplied to adjacent pixels or groups of pixels.

Accordingly, distribution of the display data (signal voltage) supplied to a plurality of adjacent pixels or a plurality of adjacent groups of pixels represents not a gradual change in the voltage level as shown in FIG. 2B, but represents an increased or decreased voltage level alternately repeated per pixel or per group of pixels.

Consequently, a luminance non-uniformity pattern that appears a horizontal width of the whole pixels as a unit is not observed as shown in FIG. 3, but a luminance non-uniformity pattern that alternately and repeatedly appears light or dark luminance per pixel or per group of pixels is observed. Specifically, a spatial frequency may be increased to the extent that the spatial frequency can little be observed, or cannot be observed with human eyes.

As a result, luminance non-uniformity appeared due to the inconsistent effects of the inductance components in the interconnect material may be reduced to such an extent that the luminance non-uniformity can little be observed or cannot be observed by human eyes without changing the current drive capability of the driver or reducing the length of the interconnect material.

According to the embodiment of the present invention, a projection display apparatus with which an optical modulation device is irradiated with light emitted from a light source and the light modulated based on the display data by the optical modulation device is projected is provided. In the projection display apparatus, an interconnect material having a plurality of signal lines disposed in parallel through which the display data are supplied from the driver, and the optical modulation device is used for a display device with which an image having suitable luminance based on the levels of the display data are displayed. Further, according to the embodiment of the present invention, within the optical modulation device, or between the interconnect materials, an interconnect structure for display device which can display an image having luminance suitable for the display data includes rearranging signal lines from which the display data are transmitted via the interconnect material such that the display data via the signal lines having a comparatively larger effect of the inductance components and the display data via the signal lines having a comparatively smaller effect of the inductance components in the interconnect material are alternately supplied to adjacent pixels or groups of pixels of the display device.

The projection display apparatus employs an interconnect structure for supplying display data to an optical modulation device according to the aforementioned embodiment, and luminance non-uniformity appeared due to the inconsistent effects of the inductance components in the interconnect material may be reduced to such an extent that the luminance non-uniformity can little be observed or cannot be observed by human eyes without changing the current drive capability of the driver or reducing the length of the interconnect material.

According to an embodiment of the present invention, the luminance non-uniformity due to the inconsistent effects of the inductance components in the interconnect material can little be observed or cannot be observed with the human eyes without changing the current drive capability of the driver or the length of the interconnect material in a case where the display data are supplied to the display device with which an image having suitable luminance based on the levels of the display data are displayed via the interconnect material having the plurality of signal lines disposed in parallel.

DESCRIPTION OF THE PREFERRED EMBODIMENTS

Hereinafter, a reflective liquid crystal display device with a dot sequential drive system to which embodiments of the present invention is applied is specifically illustrated by referring to drawings.

Figure 1:
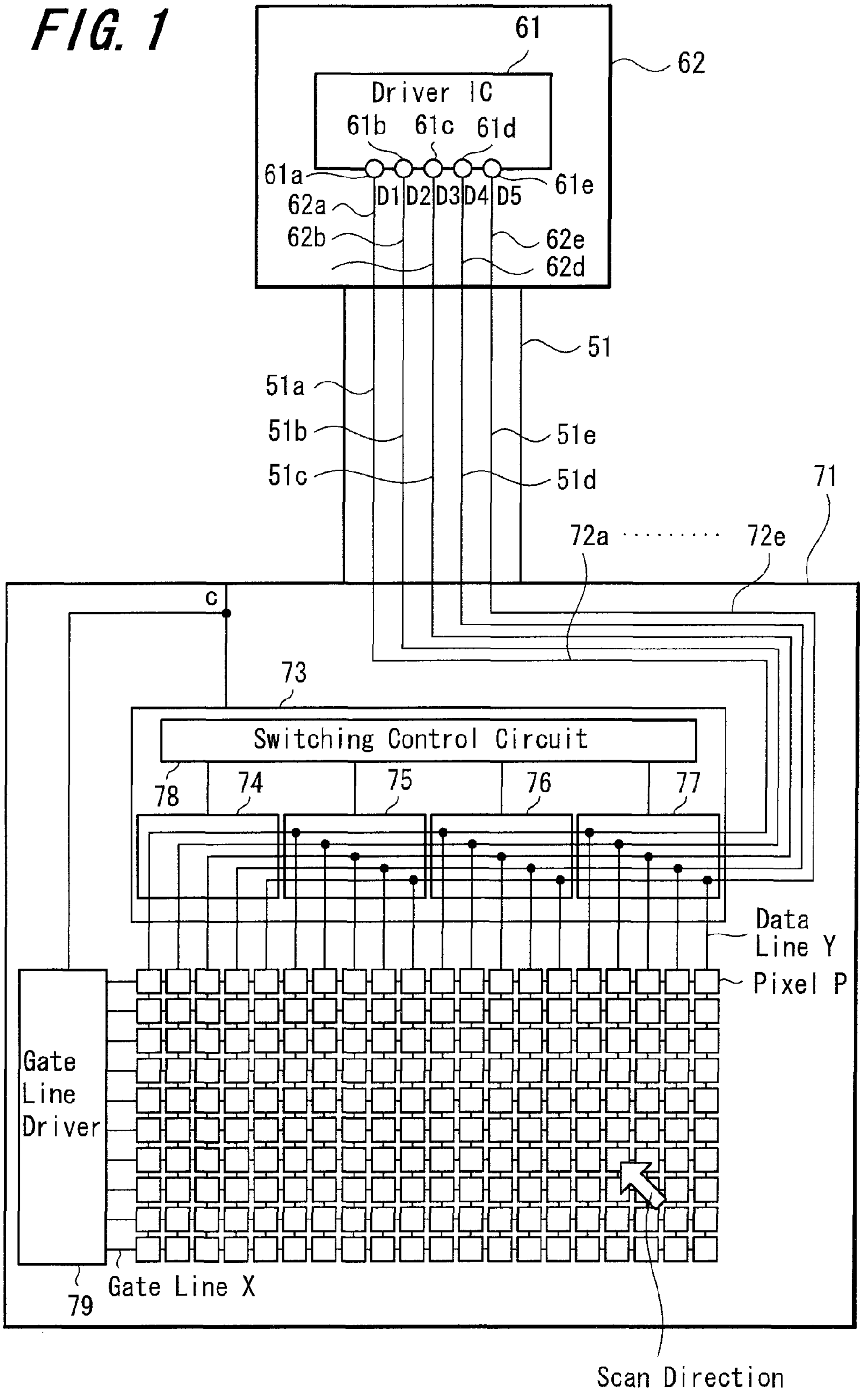
FIG. 1 is a diagram showing an interconnect structure of a liquid crystal display device in related art.

FIG. 1 is a diagram showing one example of an interconnect structure for a reflective liquid crystal display device with a dot sequential drive system to which an embodiment of the present invention is applied. In FIG. 1, a driver IC 61 and a flexible print circuit (FPC) 51 have the same configurations as the driver IC 61 and the FPC 51 shown in FIG. 1. In addition, the FPC 51 includes two ground lines (grounding for signals) provided at both ends.

In the reflective liquid crystal display device, gate lines X in the row direction and data lines Y in the column direction are arranged in a matrix form on a drive substrate 1 which is formed of a silicon substrate and a pixel (pixel drive circuit and pixel electrode) P is disposed at an intersection of the gate line X and data line Y.

The external driver IC 61 is provided with a substrate 31 other than that used in the reflective liquid crystal display device. The substrate 31 is connected with the drive substrate 1 in the reflective liquid crystal display device via the FPC (Flexible Print Circuit) 51. Display data D1 to D5 (signal voltage), each with five pixels, are respectively outputted from the output terminals 61*a* to 61*e* of the driver IC 61.

Five signal lines 31*a* to 31*e* are formed on the substrate 31 for transmitting the display data D1 to D5 to the FPC 51. In the connection side of the driver IC 61, the signal lines 31*a* to 31*e* are arranged in the order from the left of signal lines 31*a* to 31*e*, however; in the connection side of the FPC 61, the signal lines 31*a* to 31*e* are rearranged as follows:

- the signal line 31*a* is connected to the signal line 51*d* in the FPC 51.
- the signal line 31*b* is connected to the signal line 51*a* in the FPC 51.
- the signal line 31*c* is connected to the signal line 51*c* in the FPC 51.
- the signal line 31*d* is connected to the signal line 51*e* in the FPC 51.
- the signal line 31*e* is connected to the signal line 51*b* in the FPC 51.

For example, the rearrangement of the signal lines 31*a* to 31*e* may be realized with ease by using a multilayer substrate as the substrate 31.

The signal lines 31*a* to 31*e* are rearranged such that the display data D1 of the display data D1 to D5 outputted from the driver IC 61 are supplied to the substrate 1 via the signal line 51*d* in the FPC 51.

- the display data D2 are supplied to the drive substrate 1 via the signal line 51*a* in the FPC 51.
- the display data D3 are supplied to the drive substrate 1 via the signal line 51*c* in the FPC 51.
- the display data D4 are supplied to the drive substrate 1 via the signal line 51*e* in the FPC 51.
- the display data D5 are supplied to the drive substrate 1 via the signal line 51*b* in the FPC 51.

The control signal C is supplied from an external timing control circuit to the drive substrate 1 via the FPC (Flexible Print Circuit) 51 (not shown).

Five signal lines 2*a* to 2*e* are formed on the drive substrate 1 for transmitting display data to the data line driver 3 via the FPC 51. In the connection side of the FPC 51, the signal lines 2*a* to 2*e* are arranged in the order from the left of signal lines 2*a*, 2*b*, 2*c*, and 2*d* viewing from the data line driver 3 (more specifically, the signal lines 2*a* to 2*e* are respectively connected to the signal lines 51*a*, 51*b*, 51*c*, 51*d*, and 51*e*), the signal lines 2*a* to 2*e* are rearranged as follows viewing from the data line driver 3.

- the signal line 2*a* is relocated from the left end to the second position from the left.
- the signal line 2*b* is relocated from the second position from the left to the right end.
- the signal line 2*c* remains at the third (central) position from the left.
- the signal line 2*d* is relocated from the fourth position from the left to the left end.
- the signal line 2*e* is relocated from the right end to the fourth position from the left.

Figure 4:
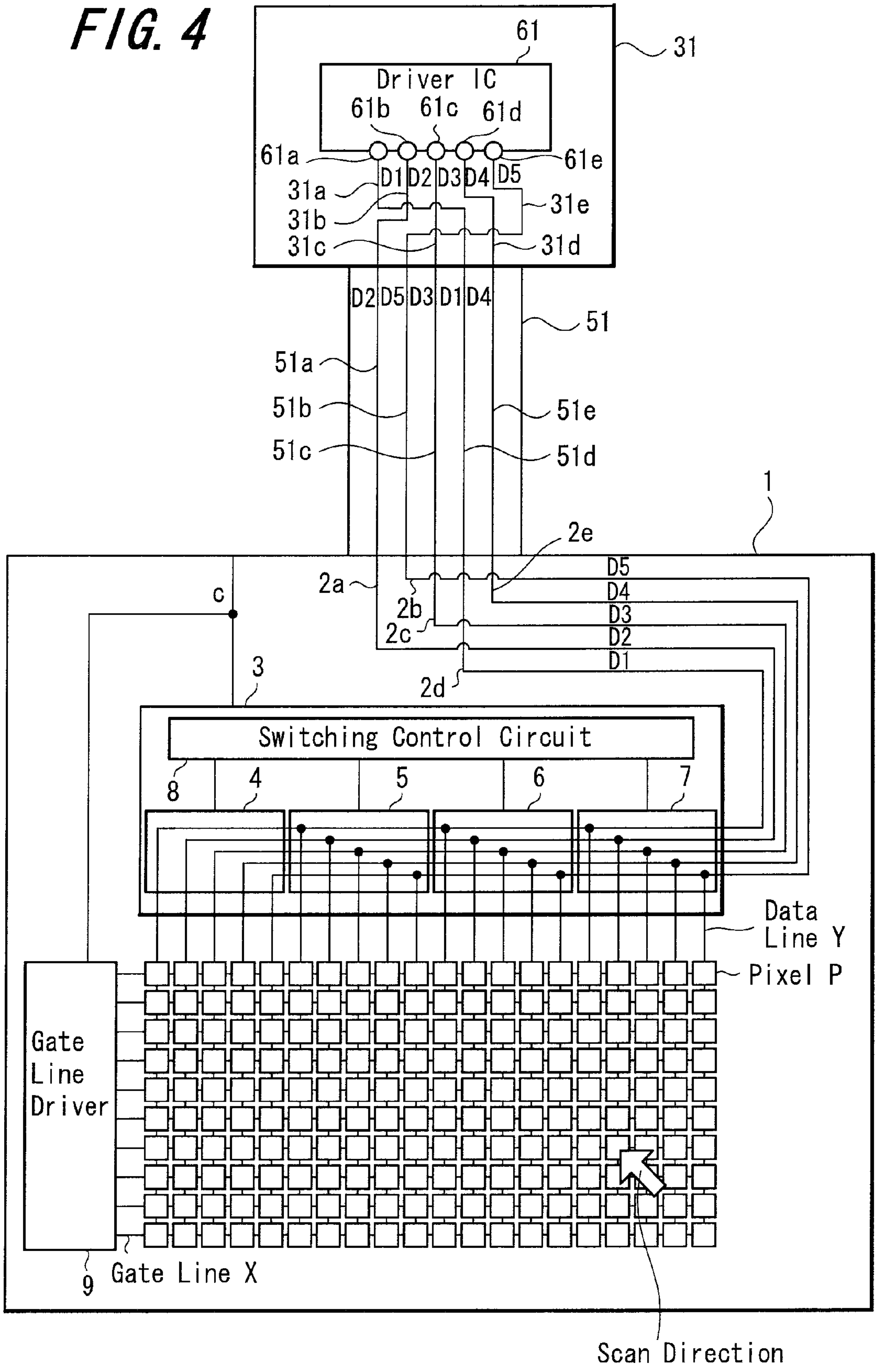
FIG. 4 is a diagram showing one example of an interconnect structure of a liquid crystal display device to which an embodiment of the present invention is applied.
Figure 5:
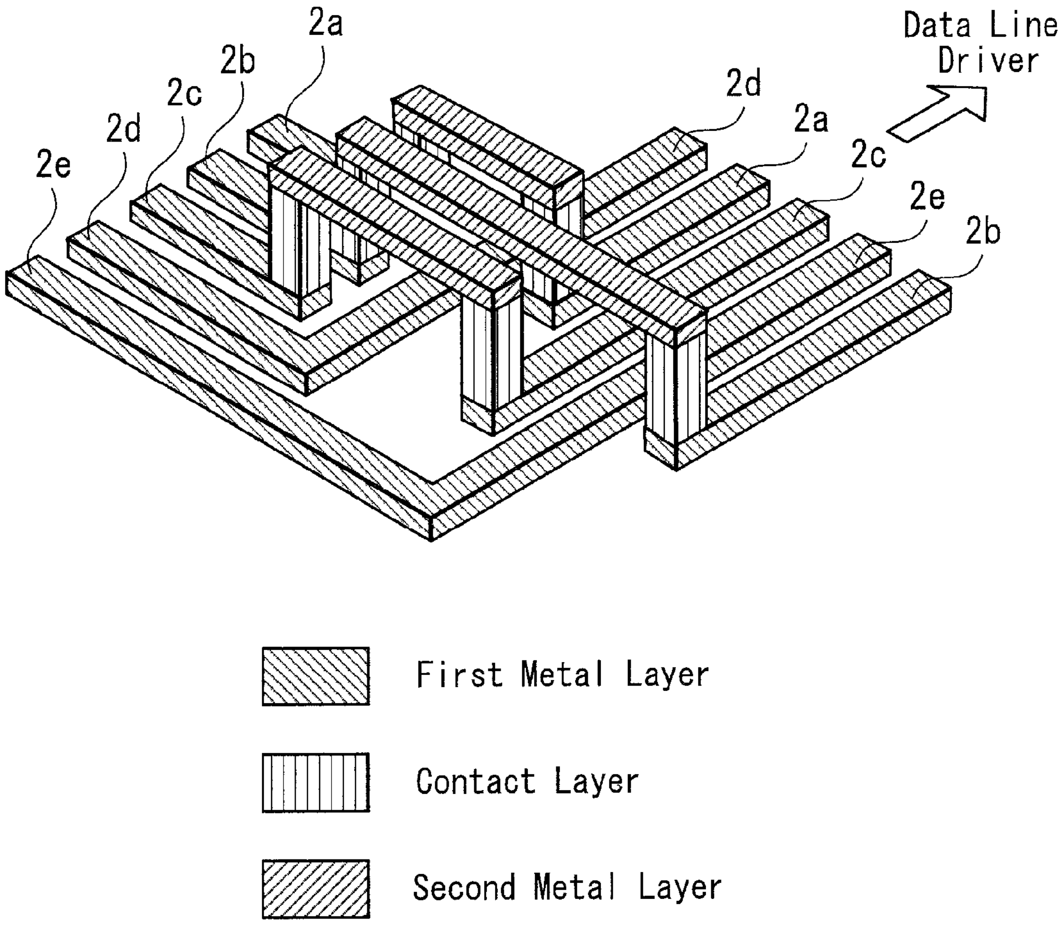
FIG. 5 is a diagram showing a specific example of forming signal lines in a drive substrate of FIG. 4.

FIG. 5 is a view specifically showing signal lines 2*a* to 2*e* formed on the drive substrate 1. FIG. 5, shows the drive substrate 1 viewed from the lower side (showing backside provided that the view in FIG. 4 is upper side view). A plurality of metal layers are formed on a silicon substrate forming the drive substrate 1 by a CMOS process, and one of the metal layers (also referred to as "first metal layer") is a layer including the signal lines 2*a* to 2*e*.

It should be noted that at intersections of the signal lines 2*a* to 2*e* in FIG. 4, the signal line 2*a* is formed via the contact layer on the metal layer (also referred to as "second metal layer") located lower side of the first metal layer so as not to interfere with the signal line 2*d*. Further, the signal line 2*b* is formed on the second metal layer via the contact layer so as not to interfere with the signal line 2*c*, 2*d*, and 2*e*. The signal line 2*c* is formed on the second metal layer via the contact layer so as not to interfere with the signal line 2*d*. Thus, the rearrangement of the signal lines 2*a* to 2*e* is realized as part of the CMOS process in producing the drive substrate 1.

Due to the rearrangement of the signal lines 2*a* to 2*e*, the display data D2 via the signal line 51*a* in the FPC 51 are transmitted to the data line driver 3 as the display data that should be written in the pixel at the second position from the left of the adjacent five pixels. The display data D5 via the signal line 51*b* in the FPC 51 are transmitted to the data line driver 3 as the display data that should be written in the pixel at the right end of the adjacent five pixels P. The display data D3 via the signal line 51*c* in the FPC 51 are transmitted to the data line driver 3 as the display data that should be written in the pixel at the center of the adjacent five pixels P. The display data D1 via the signal line 51*d* in the FPC 51 are transmitted to the data line driver 3 as the display data that should be written in the pixel at the left end of the adjacent five pixels. The display data D4 via the signal line 51*e* in the FPC 51 are transmitted to the data line driver 3 as the display data that should be written in the pixel at the fourth position from the left of the adjacent five pixels P.

All the display data D1 to D5 are supplied to the four respective change-over switches 4 to 7 in the data line driver 3.

The control signal C supplied to the drive substrate 1 is supplied to the gate line driver 9 and the data line driver 3. The gate line driver 9 scans the gate line X based on the control signal C. In the data line drivers 3, the switching control circuit 8 controls the change-over switches 4 to 7 based on the control signal C.

As indicated by an arrow in the figure, the following shows operations of the dot sequential drive system in a case where the gate lines X are scanned from the lower end to the upper end in the display region, and the data lines Y are switched from the right end to left end in the display region.

First, the display data D1 to D5 are supplied to the five data lines Y at the right side by switching on the change-over switch 7 alone using the switching control circuit 8 in the data line driver 3 while the gate line driver 9 scans the lowest row of the gate line X. Thus, the adjacent five pixels P at the right side in the lowest row are written.

Subsequently, the display data D1 to D5 are supplied to the five data lines Y at the slightly right side of the center by switching on the change-over switch 6 alone using the switching control circuit 8 in the data line driver 3 while the gate line driver 9 scans the lowest row of the gate lines. Thus, the adjacent five pixels P at the slightly right side of the center in the lowest row are written.

The display data D1 to D5 are supplied to the five data lines Y at the slightly left side of the center by switching on the change-over switch 5 alone using the switching control circuit 8 in the data line driver 3 while the gate line driver 9 scans the lowest row of the gate lines. Thus, the adjacent five pixels P at the slightly left side of the center in the lowest row are written.

The display data D1 to D5 are supplied to the five data lines Y at the left side by switching on the change-over switch 4 alone in the data line driver 3 while the gate line driver 9 scans the lowest row of the gate lines. Thus, the adjacent five pixels P at the left side in the lowest row are written.

Subsequent to writing the pixels in the lowest row, the gate line in the second from the lowest row is scanned in the similar order. Writing is repeated in the similar order while scanning the gate lines per line in the upper direction.

Figure 2A:
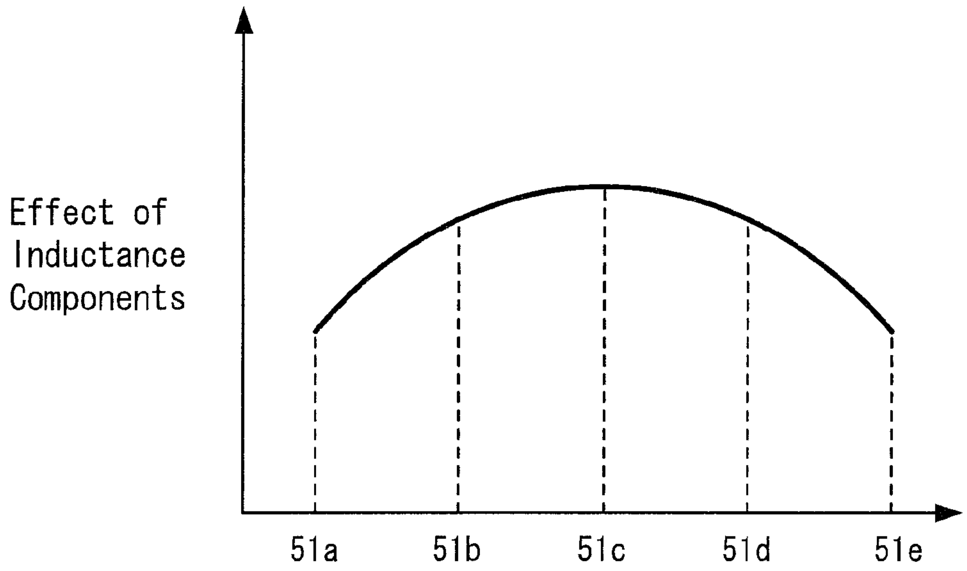
FIGS. 2A and 2B are diagrams showing distribution of levels of the display data due to the interconnect structure of FIG. 1.
Figure 6A:
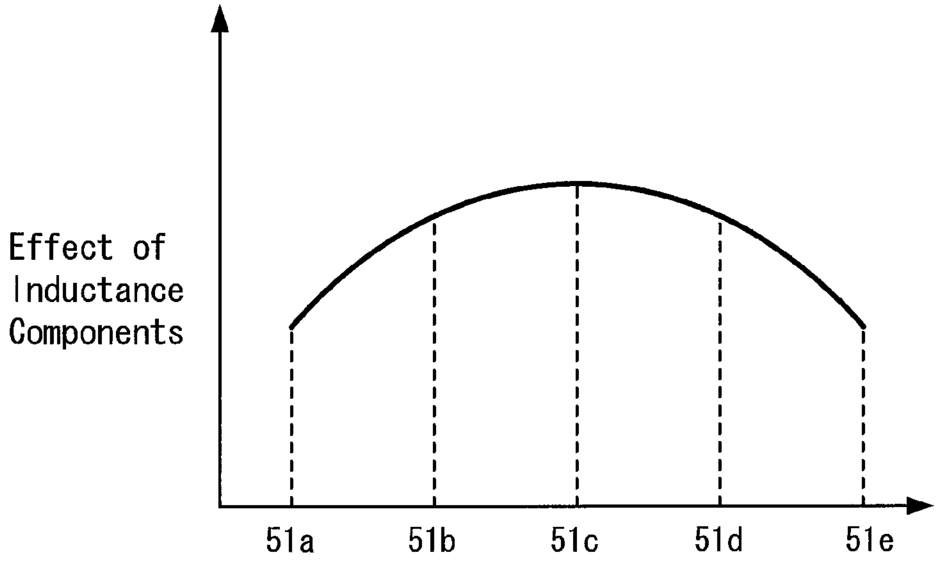
FIGS. 6A and 6B are diagrams showing distribution of levels of the display data due to the interconnect structure of FIG. 4.

Luminance non-uniformity appeared in the reflective liquid crystal display device due to the inconsistent effects of the inductance components in the FPC 51 is described as follows. FIG. 6A shows distribution representing significance in the effect of the inductance components on respective signal lines 51*a* to 51*e* in the FPC 51. Since the FPC 51 includes two ground lines (grounding for signals) located at both ends of the FPC 51, the effect of the inductance components on the signal lines gradually becomes larger in the order of the signal lines 51*a*, 51*b*, and 51*c* located closer positions from the end of the FPC 51; and the effect on the signal lines gradually becomes smaller in the order of the signal lines 51*c*, 51*d*, and 51*e* located closer positions from the end of the FPC 51. Thus, the distribution includes one positive peak. The distribution is the same as that shown in FIG. 2A.

However, as described earlier, since the signal lines 2*a* to 2*e* from which the display data are transmitted are rearranged in the drive substrate 1 of the reflective liquid crystal display device, the display data D1 transmitted via the signal line 51*d* in the FPC 51 are supplied to the pixel at the left end of the adjacent 5 pixels. The display data transmitted via the signal line 51*a* (signal line having a smaller effect of the inductance components than the signal line 51*d*) in the FPC 51 are supplied to the pixel at the second position from the left. The display data D3 transmitted via the signal line 51*c* (signal line having a lager effect of the inductance components than the signal line 51*a*) in the FPC 51 are supplied to the pixel at the center. The display data D4 transmitted via the signal line 51*e* (signal line having a smaller effect of the inductance components than the signal line 51*c*) in the FPC 51 are supplied to the pixel at the fourth position from the left. The display data D5 transmitted via the signal line 51*b* (signal line having a lager effect of the inductance components than the signal line 51*e*) in the FPC 51 are supplied to the pixel at the right end.

Accordingly, the display data via the signal lines having a comparatively larger effect of the inductance components and the display data via the signal lines having a comparatively smaller effect of the inductance components in the FPC 51 of the reflective liquid crystal display device are alternately supplied to the adjacent five pixels.

Figure 2B:
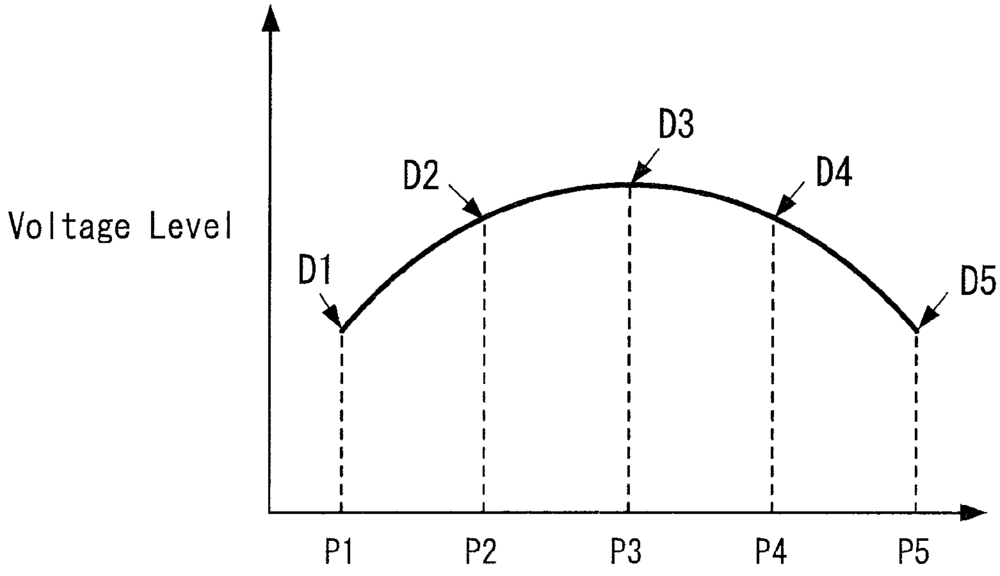
Figure 6B:
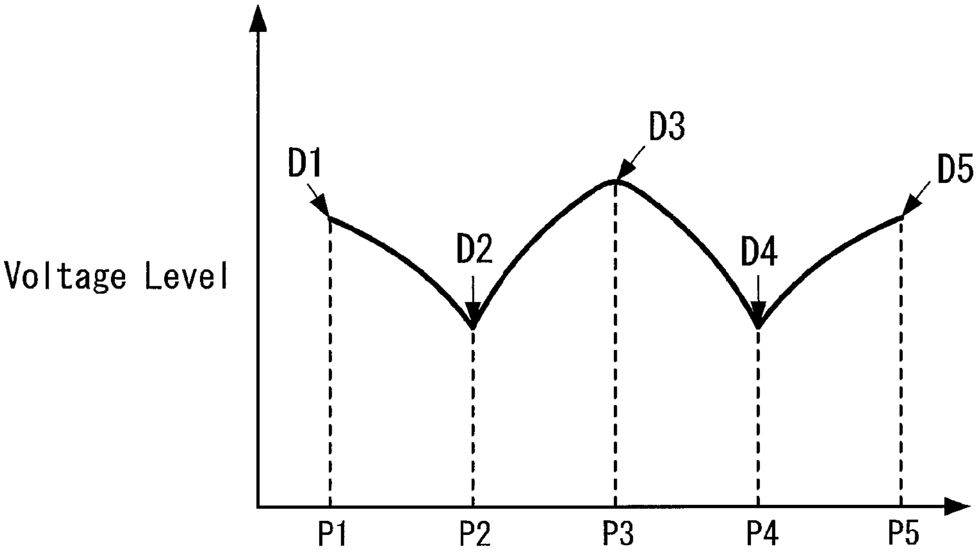

As shown in FIG. 6B, distribution represents the display data D1 to D5 supplied to adjacent five pixels P1 to P5 described as follows:

the voltage level of the display data D2 supplied to the pixel P2 at the second position from the left is lower than that of the display data D1 supplied to the pixel P1 at the left end; the voltage level of the display data D3 supplied to the pixel P3 at the center is higher than that of the display data D2;

the voltage level of the display data D4 supplied to the pixel P4 at the fourth position from the left is lower than that of the display data D3; and the voltage level of the display data D5 supplied to the pixel P5 at the right end is higher than that of the display data D4. Specifically, the distribution represents not a gradual change in the voltage level as shown in FIG. 2B, but represents an increased or decreased voltage level alternately repeated per pixel.

Figure 3:
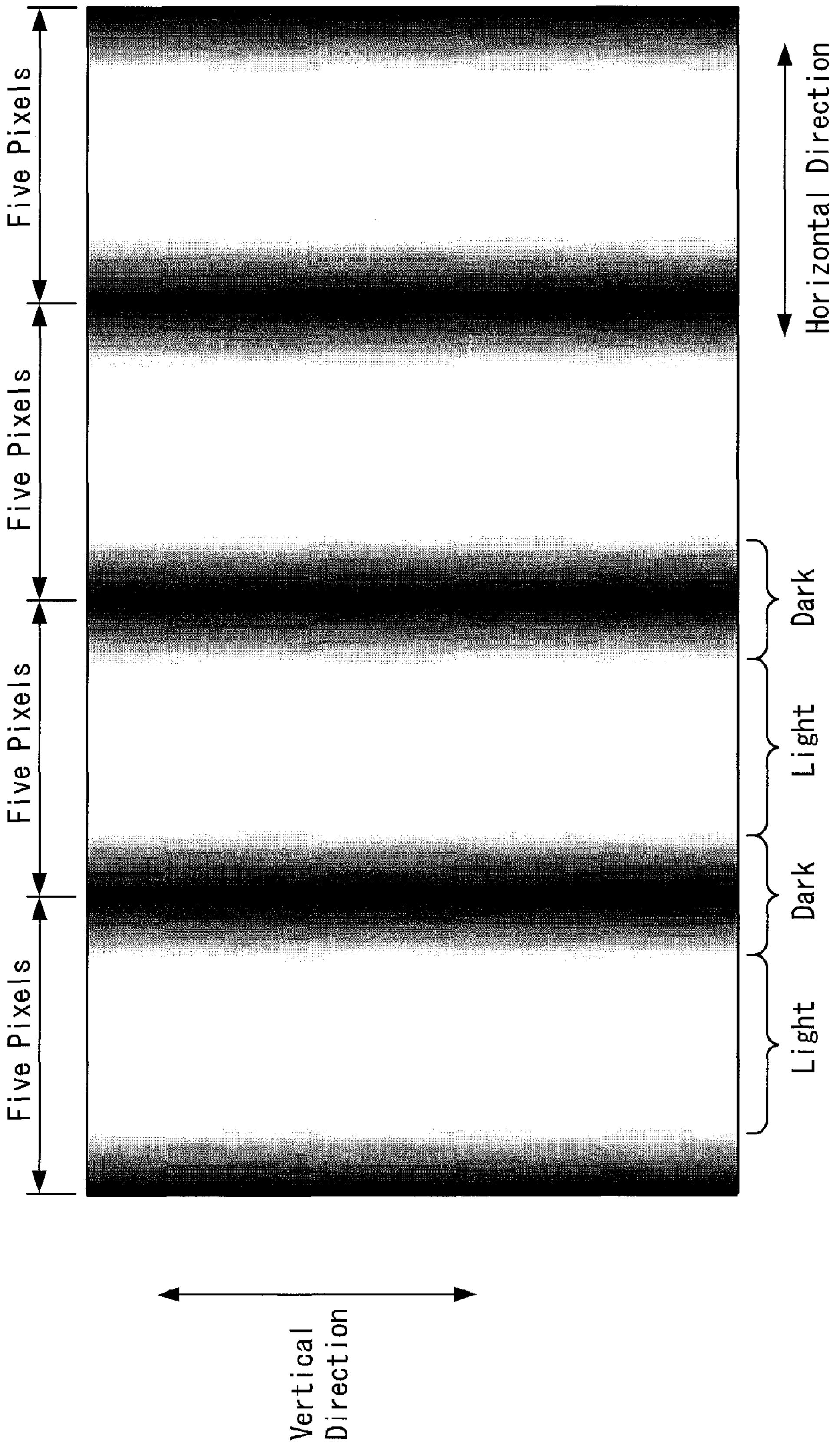
FIG. 3 is a diagram showing luminance non-uniformity of the liquid crystal display device of FIG. 1.
Figure 7:
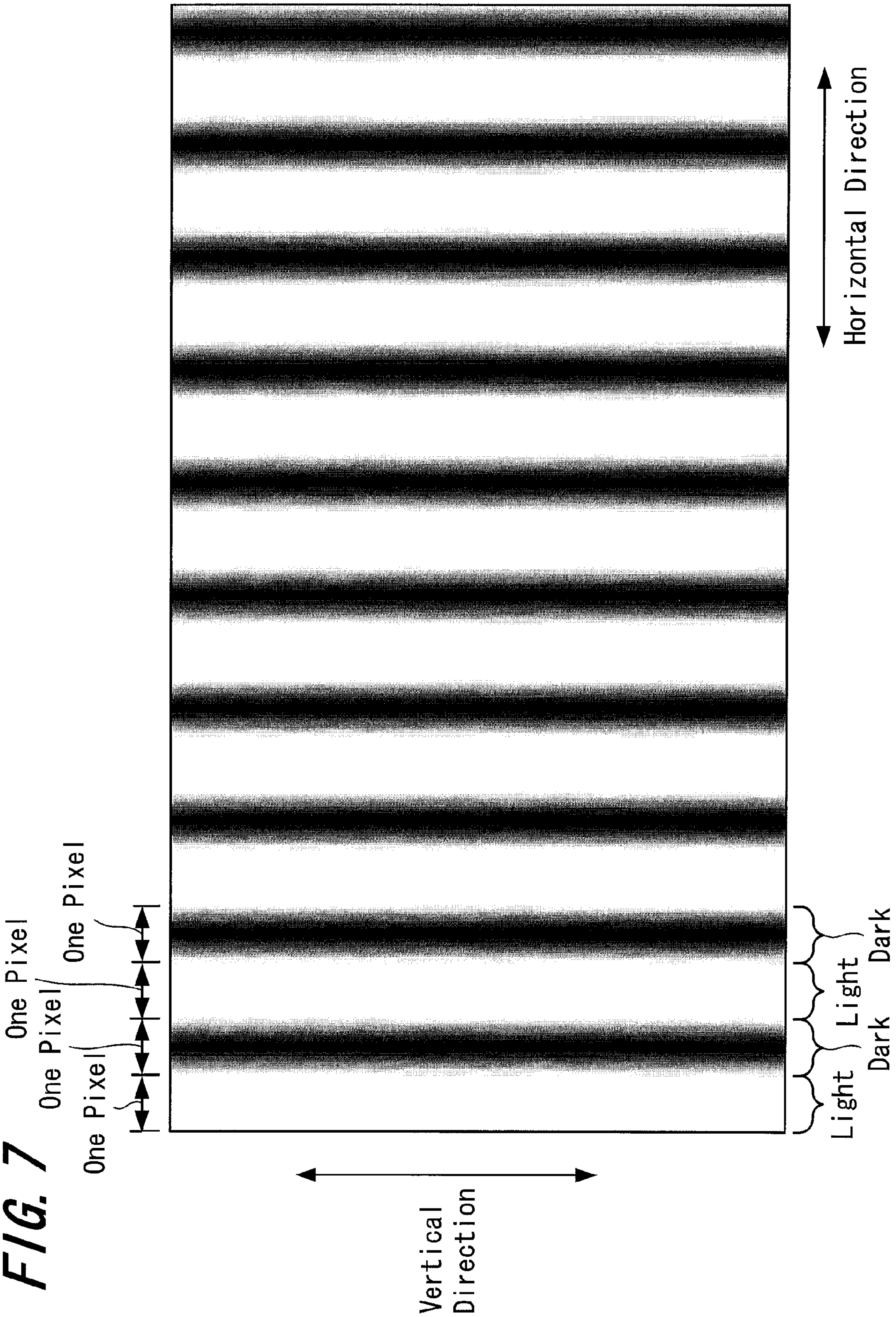
FIG. 7 is a diagram showing luminance non-uniformity of the liquid crystal display device of FIG. 4.

Consequently, in the reflective liquid crystal display device, a luminance non-uniformity pattern that appears a horizontal width of five pixels as a unit is not observed as shown in FIG. 3, but a luminance non-uniformity pattern that alternately and repeatedly appears light or dark luminance per pixel is observed as shown in FIG. 7. Specifically, a spatial frequency may be increased to the extent that the spatial frequency can little be observed, or cannot be observed with human eyes.

As a result, the luminance non-uniformity appeared due to the inconsistent effects of the inductance components in the FPC 51 may be reduced to such an extent that the luminance non-uniformity can little be observed or cannot be observed by human eyes without changing the current drive capability of the driver IC 61 or reducing the length of the DPC 51.

FIG. 4 shows an example of writing the five pixels as a unit for convenience of illustrating figures; however, in practice, the larger number of pixels such as adjacent 24 pixels as a unit is written in the reflective liquid crystal display device with a dot sequential drive system. According to an embodiment of the present invention, a luminance non-uniformity pattern that appears a horizontal width of 24 pixels as a unit is not observed, but a luminance non-uniformity pattern that alternately and repeatedly appears light or dark luminance per pixel is observed. Thus, since the spatial frequency of the luminance non-uniformity pattern is increased, the effect of improving an image quality is further increased.

Furthermore, since a luminance non-uniformity pattern can be improved without an increase in the current drive capability of the driver IC, a relatively inexpensive driver IC can be used. Since a luminance non-uniformity pattern can be improved without changing the length of the flexible print circuit, the flexible print circuit can be designed with an increased flexibility while retaining the same length. Alternatively, the flexible print circuit can be designed with increased length if the capability of the driver IC is sufficient.

In the substrate 31 including the driver IC 61, the five signal lines 31*a* to 31*e* from which the display data D1 to D5 are transmitted to the FPC 51 are rearranged such that the same display data as those used without rearranging the signal lines 2*a* to 2*e* in the substrate 1 are supplied to the pixels of the reflective liquid crystal display device; that is, as shown in FIG. 6, the five signal lines 31*a* to 31*e* are rearranged such that the display data D1 are supplied to the pixel P1 at the left end, the display data D2 are supplied to the pixel P2 at the second position from the left, the display data D3 are supplied to the pixel P3 at the center, the display data D4 are supplied to the pixel P4 at the fourth position from the left, the display data D5 are supplied to the pixel P5 at the right end as shown in FIG. 3.

Accordingly, the display data suitable for a particular position of the pixel can be supplied to each pixel of the reflective liquid crystal display device without changing the following output manner of the display data D1 to D5 from the driver IC 61; that is, the display data D1 for supplying to the pixel at the left end are outputted from the output terminal 61*a*, the display data D2 for supplying to the pixel at the second position from the left are outputted from the output terminal 61*b*, the display data D3 for supplying to the pixel at the center are outputted from the output terminal 61*c*, the display data D4 for supplying to the pixel at the fourth position from the left are outputted from the output terminal 61*d*, and the display data D5 for supplying to the pixel at the right end are outputted from the output terminal 61*e*.

Figure 8:
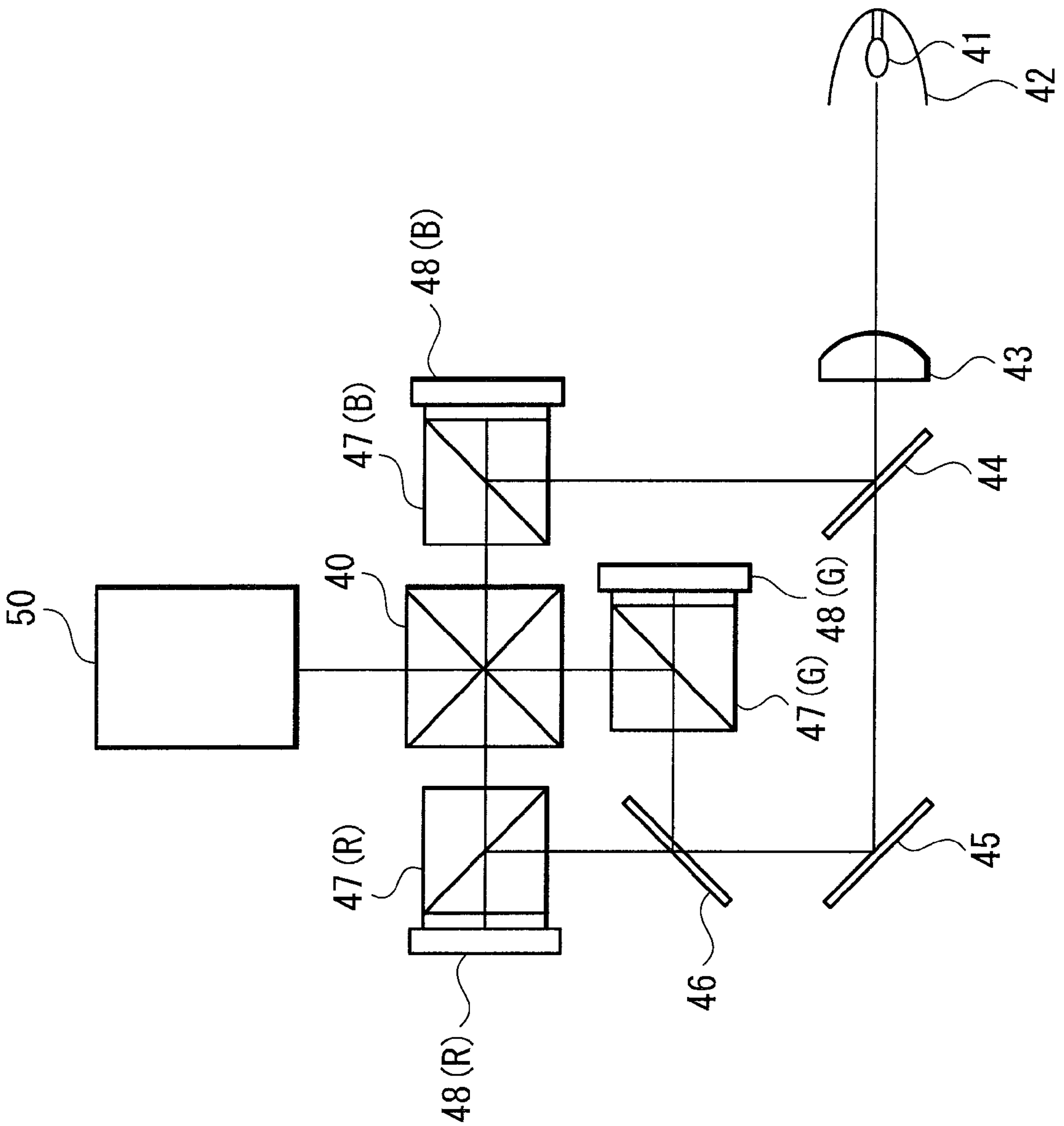
FIG. 8 is a diagram showing a configuration example of an optical system of a liquid crystal projector to which an embodiment of the present invention is applied.

FIG. 8 is a diagram showing a configuration example of a liquid crystal projector to which an embodiment of the present invention is applied. The liquid crystal projector includes: a reflector 42 with which light emitted from a discharge lamp 41 as a light source is changed into parallel light, a focused lens 43 through which the parallel light is passed, and a dichroic mirror 44 for reflecting blue light on which incident light is projected. Red light and green light transmitted through the dichroic mirror 44 are reflected by a mirror 45, and the reflected light is projected on the dichroic mirror 46 that reflects green light.

Red light transmitted through the dichroic mirror 46, green light reflected by the dichroic mirror 46, and blue light reflected by the dichroic mirror 44 are respectively projected on the polarization beam splitters 47(R), 47(G), and 47(B). A specific linear polarization of blue light, green light, or red light (i.e., any one of P polarization and S polarization) is projected on the respective reflective liquid crystal display devices with dot sequential drive systems 48(R), 48(G), and 48(B) through the polarization beam splitters 47(R), 47(G), and 47(B).

The display data R, G, and B are supplied to the driver substrates of the reflective liquid crystal display devices 48(R), 48(G), and 48(B) from the external driver ICs via the flexible print circuits in the same manner as shown in FIG. 4 (not shown). The respective driver substrates of the reflective liquid crystal display devices 48(R), 48(G), and 48(B) include the same configurations as the substrate shown in FIG. 4. Further, the substrate including the driver IC is provided with the signal lines having the same interconnect structure as the signal lines 31*a* to 31*e* shown in FIG. 4 for transmitting the display data to the flexible print circuit.

The incident light projected on the reflective liquid crystal display devices 48(R), 48(G), and 48(B) is modulated based on the display data R, G, and B, and reflected by the reflective liquid crystal display devices 48(R), 48(G), and 48(B). A specific linear polarization of reflected light from the reflective liquid crystal display devices 48(R), 48(G), and 48(B) is synthesized by a dichroic prism 40 through the polarization beam splitters 47(R), 47(G), and 47(B), and projected on a screen (now shown) from a projection lens 50.

In this liquid crystal projector, luminance non-uniformity appeared in a projected image on screen due to the inconsistent effects of the inductance components in the flexible print circuit may be reduced to such an extent that the luminance non-uniformity can little be observed or cannot be observed with human eyes without changing the current drive capability of the driver IC or decreasing the length of the flexible print circuit.

It should be noted that the interconnect structure of the drive substrate 1 shown in FIG. 4 is supposed to employ an FPC 51 of which only two ground lines (grounding for signals) are provided at both ends. However, if using a flexible print circuit differing in the number of ground lines and in positions of the ground lines from the aforementioned flexible print circuit, the signal lines in the drive substrate 1 from which the display data are transmitted are rearranged such that the display data via the signal lines having a comparatively larger effect of the inductance components and the display data via the signal lines having a comparatively smaller effect of the inductance components in such flexible print circuit are alternately supplied to the adjacent pixels. Accordingly, the luminance non-uniformity due to the inconsistent effects of the inductance components in the flexible print circuit can be reduced to such an extent that the luminance non-uniformity can little be observed or cannot be observed with human eyes.

Figure 9:
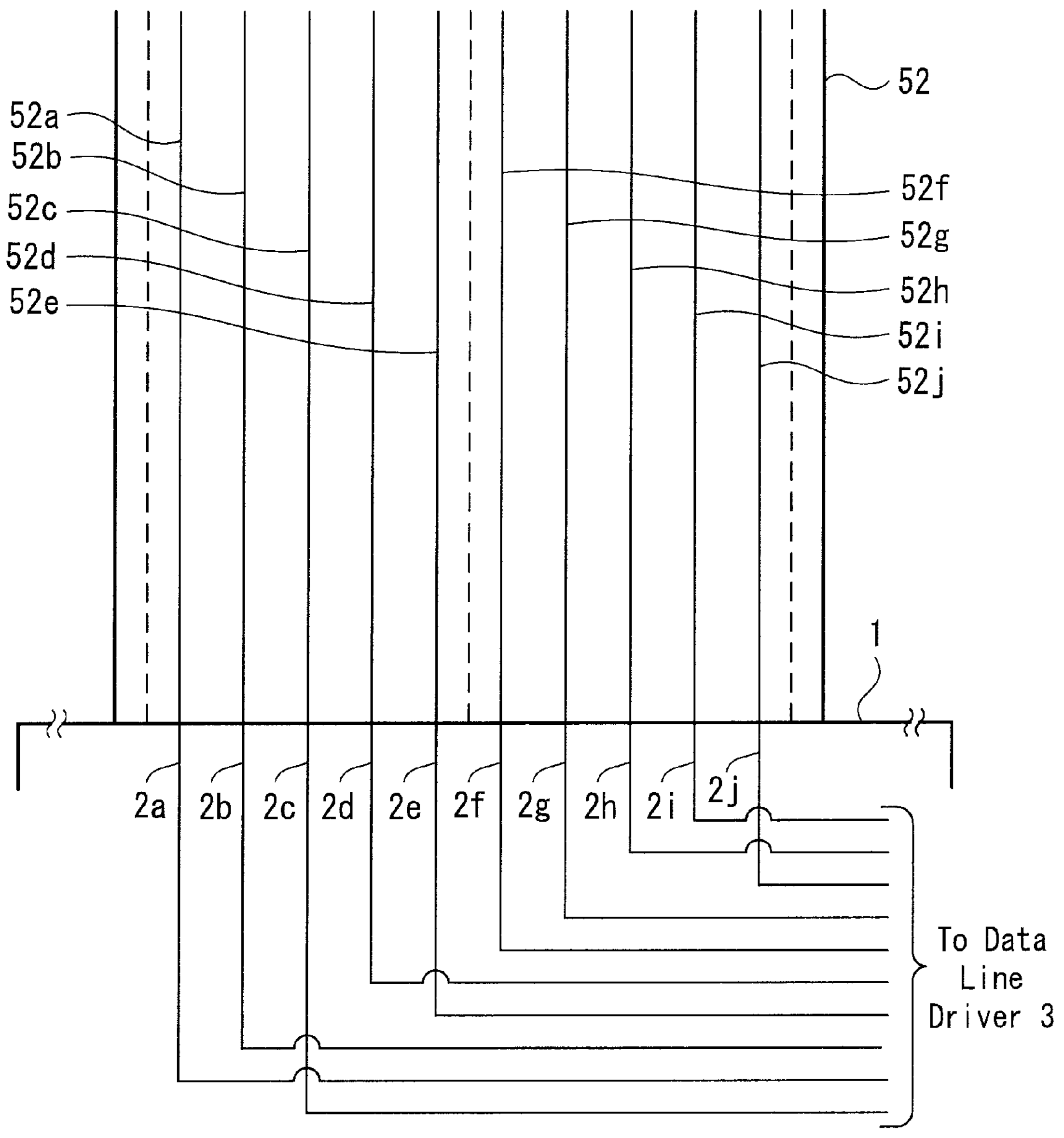
FIG. 9 is another example of the interconnect structure of the drive substrate of FIG. 4.

FIG. 9 shows an embodiment of an interconnect structure of the drive substrate 1 in a case where the FPC (Flexible Print Circuit) 52 including 10 signal lines 52*a* to 52*j* and three ground lines located at both ends and at the center (between signal lines 52*e* and 52*f* shown by the broken lines) of the FPC are used for writing in the 10 adjacent pixels as a unit. Ten signal lines 2*a* to 2*j* are formed on the drive substrate 1 for transmitting display data to the data line driver 3 via the FPC 52. (In this embodiment, change-over switches 4 to 7 shown in FIG. 4 are provided with the data line driver 3 for supplying the display data to the 10 data lines Y as a unit instead of providing the change-over switches for supplying the display data to the five data lines Y as a unit).

In the connection side of the FPC 52, the signal lines 2*a* to 2*j* are arranged in the order from the left of signal lines 2*a*, 2*b*, 2*c*, 2*d*, 2*e*, 2*f*, 2*g*, 2*h*, 2*i* and 2*j* viewing from the data line driver 3 (more specifically, the signal lines 2*a* to 2*j* are respectively connected to the signal lines 52*a*, 52*b*, 52*c*, 52*d*, 52*e*, 52*f*, 52*g*, 52*h*, 52*i* and 52*j*), the signal lines 2*a* to 2*j* are rearranged as follows viewing from the data line driver 3.

- the signal line 2*a* is relocated from the left end to the second position from the left.
- the signal line 2*b* is relocated from the second to the third position from the left.
- the signal line 2*c* is relocated from the third from the left to the left end.
- the signal line 2*d* is relocated from the fourth to the fifth position from the left.
- the signal line 2*e* is relocated from the fifth to the fourth position from the left.
- the signal line 2*f* remains at the sixth position from the left.
- the signal line 2*g* remains at the seventh position from the left.
- the signal line 2*h* is relocated from the eighth to the ninth position from the left.
- the signal line 2*i* is relocated from the ninth position from the left to the right end.
- the signal line 2*j* is relocated from the right end to the eighth position from the left.

Figure 10A:
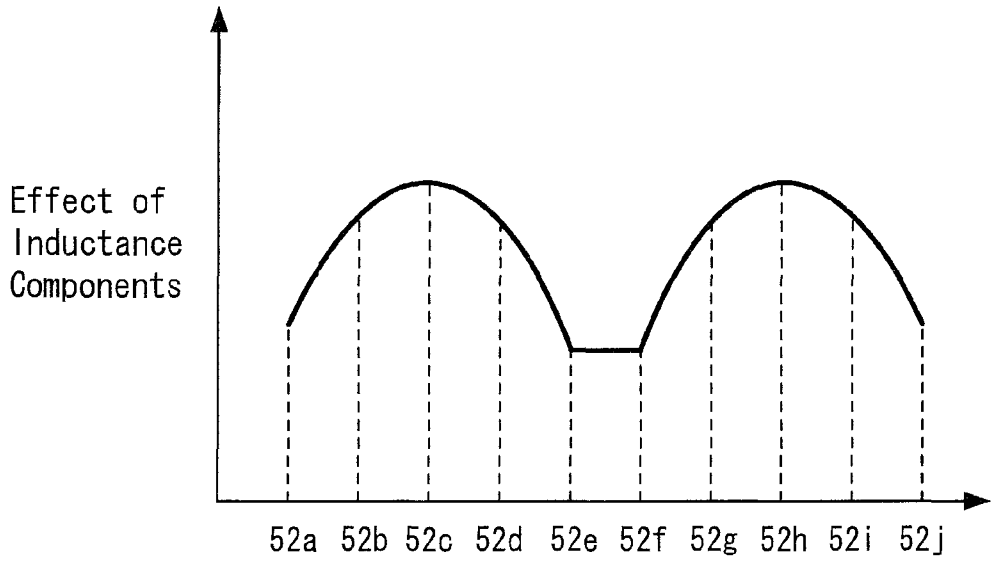
FIGS. 10A and 10B are diagrams showing distribution of levels of the display data due to the interconnect structure of FIG. 9.

FIG. 10A shows distribution representing significance in the effect of the inductance components on respective signal lines 52*a* to 52*j* in the FPC 52. Since the FPC 52 includes three ground lines located at both ends and at the center of the FPC 52, the effect of the inductance components on the signal lines gradually becomes larger in the order of the signal lines 52*a*, 52*b*, and 52*c* located closer positions from the end of the FPC 52; and the effect on the signal lines gradually becomes smaller in the order of the signal lines 52*c*, 52*d*, and 52*e* located closer positions from the center of the FPC 52. Further, the effect of the inductance components on the signal lines gradually becomes larger in the order of the signal lines 52*f*, 52*g*, and 52*h* located closer positions from the end of the FPC 52; and the effect on the signal lines gradually becomes smaller in the order of the signal lines 52*h*, 52*i*, and 52*j* located closer positions from the end of the FPC 52. Thus, the distribution includes two positive peaks.

However, since the signal lines 2*a* to 2*h* from which the display data are transmitted are rearranged in the drive substrate 1 as described earlier, the display data transmitted via the signal line 52*c* in the FPC 52 are supplied to the pixel at the left end of the adjacent 10 pixels. The display data transmitted via the signal line 52*a* (signal line having a smaller effect of the inductance components than the signal line 52*c*) in the FPC 52 are supplied to the pixel at the second position from the left. The display data transmitted via the signal line 52*b* (signal line having a lager effect of the inductance components than the signal line 52*a*) in the FPC 52 are supplied to the pixel at the third position from the left. The display data transmitted via the signal line 52*e* (signal line having a smaller effect of the inductance components than the signal line 52*b*) in the FPC 52 are supplied to the pixel at the fourth position from the left. The display data transmitted via the signal line 52*d* (signal line having a lager effect of the inductance components than the signal line 52*e*) in the FPC 52 are supplied to the pixel at the fifth position from the left.

The display data transmitted via the signal line 52*f* (signal line having a smaller effect of the inductance components than the signal line 52*d*) in the FPC 52 are supplied to the pixel at the sixth position from the left. The display data transmitted via the signal line 52*g* (signal line having a lager effect of the inductance components than the signal line 52*f*) in the FPC 52 are supplied to the pixels at the seventh position from the left. The display data transmitted via the signal line 52*j* (signal line having a smaller effect of the inductance components than the signal line 52*g*) in the FPC 52 are supplied to the pixel at the eighth position from the left. The display data transmitted via the signal line 52*h* (signal line having a lager effect of the inductance components than the signal line 52*j*) in the FPC 52 are supplied to the pixel at the ninth position from the left. The display data transmitted via the signal line 52*i* (signal line having a smaller effect of the inductance components than the signal line 52*h*) in the FPC 52 are supplied to the pixel at the right end.

Accordingly, the display data via the signal lines having a comparatively larger effect of the inductance components and the display data via the signal lines having a comparatively smaller effect of the inductance components in the FPC 52 are alternately supplied to the adjacent 10 pixels.

Figure 10B:
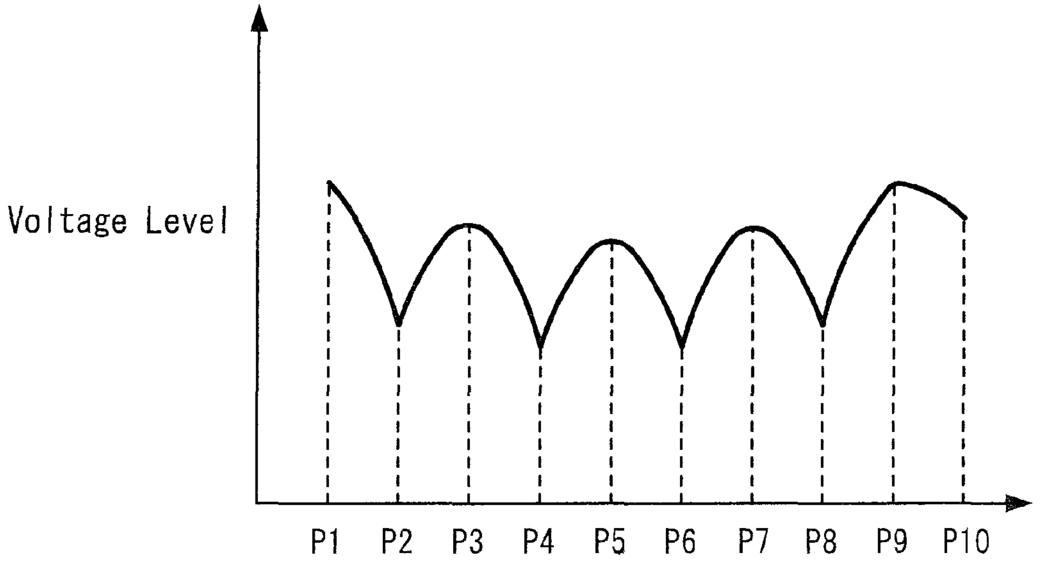

FIG. 10B shows distribution of the display data supplied to adjacent 10 pixels P1 to P10 described as follows:

the voltage level of the display data supplied to the pixel P2 at the second position from the left is lower than that of the display data supplied to the pixel P1 at the left end;

the voltage level of the display data supplied to the pixel P3 at the third position from the left is higher than that of the display data supplied to the pixel P2;

the voltage level of the display data supplied to the pixel P4 at the fourth position from the left is lower than that of the display data supplied to the pixel P3;

the voltage level of the display data supplied to the pixel P5 at the fifth position from the left is higher than that of the display data supplied to the pixel P4;

the voltage level of the display data supplied to the pixel P6 at the sixth position from the left is lower than that of the display data supplied to the pixel P5;

the voltage level of the display data supplied to the pixel P7 at the seventh position from the left is higher than that of the display data supplied to the pixel P6;

the voltage level of the display data supplied to the pixel P8 at the eighth position from the left is lower than that of the display data supplied to the pixel P7;

the voltage level of the display data supplied to the pixel P9 at the ninth position from the left is higher than that of the display data supplied to the pixel P8; and the voltage level of the display data supplied to the pixel P10 at the right end is lower than that of the display data supplied to the pixel P9. Specifically, the distribution represents an increased or decreased voltage level alternately repeated per pixel as shown in FIG. 6B.

Consequently, the 10 pixels P1 to P10 may include a luminance non-uniformity pattern that alternately and repeatedly appears light or dark luminance per pixel as shown in FIG. 7. As a result, luminance non-uniformity appeared due to the inconsistent effects of the inductance components in the FPC 52 may be reduced to such an extent that the luminance non-uniformity can little be observed or cannot be observed by human eyes.

FIG. 4 shows an embodiment in which the signal lines 2*a* to 2*e* from which the display data are transmitted are rearranged in the drive substrate 1 of the reflective liquid crystal display device. However, an alternative embodiment suggests that a substrate (e.g., multilayer substrate) is interposed between the drive substrate 1 and the FPC 51, and a plurality of signal lines from which the display data are transmitted may be rearranged within this substrate instead of rearranging the signal lines 2*a* to 2*e*.

FIG. 4 shows an embodiment in which the signal lines 31*a* to 31*e* from which the display data D1 to D5 are transmitted are rearranged in the substrate 31 including the driver IC 61. However, an alternative embodiment suggests that an output manner of the display data D1 to D5 from the driver IC 61 may be changed without rearranging the signal lines 31*a* to 31*e* such that the display data D2 for supplying to the pixel at the second position from the left are outputted from the output terminal 61*a*, the display data D5 for supplying to the pixel at the right end are outputted from the output terminal 61*b*, the display data D3 for supplying to the pixel at the center position are outputted from the output terminal 61*c*, the display data D1 for supplying to the pixel at the left end are outputted from the output terminal 61*d*, and the display data D4 for supplying to the pixel at the fourth position from the left are outputted from the output terminal 61*e*. Accordingly, each pixel used in the reflective liquid crystal display device may be supplied with the display data that are suitable for the position of the pixel.

Alternatively, if the display data having the equal luminance level are supplied to all the pixels, only the signal lines 2*a* to 2*e* may be rearranged without rearranging the signal lines 31*a* to 31*e*, or without changing the output manner of the display data D1 to D5 from the driver IC 61.

Further, FIG. 4 and FIG. 9 show embodiments in which the signal lines used for the display data transmission in the drive substrate are rearranged such that the display data via the signal lines having a comparatively larger effect of the inductance components and the display data via the signal lines having a comparatively smaller effect of the inductance components in the FPC are alternately supplied to the adjacent pixels (per pixel). However, the rearrangement of the signal lines is not limited to the signal lines supplying the respective display data alternately to the adjacent pixels. The signal lines used for the display data transmission in the drive substrate may be rearranged such that the display data via the signal lines having a comparatively larger effect of the inductance components and the display data via the signal lines having a comparatively smaller effect of the inductance components in the FPC are alternately supplied to the adjacent groups, each of which includes two or more pixels.

With this manner, a luminance non-uniformity pattern that appears one positive peak with the horizontal width of the total pixels as a writing unit is not observed, but a luminance non-uniformity pattern that alternately and repeatedly appears light or dark luminance per pixel group is observed. Specifically, a spatial frequency may be increased to the extent that the spatial frequency can little be observed, or cannot be observed with human eyes.

As a result, luminance non-uniformity appeared due to the inconsistent effects of the inductance components in the interconnect material may be reduced to such an extent that the luminance non-uniformity can little be observed or cannot be observed by human eyes without changing the current drive capability of the driver or reducing the length of the interconnect material.

Figure 11:
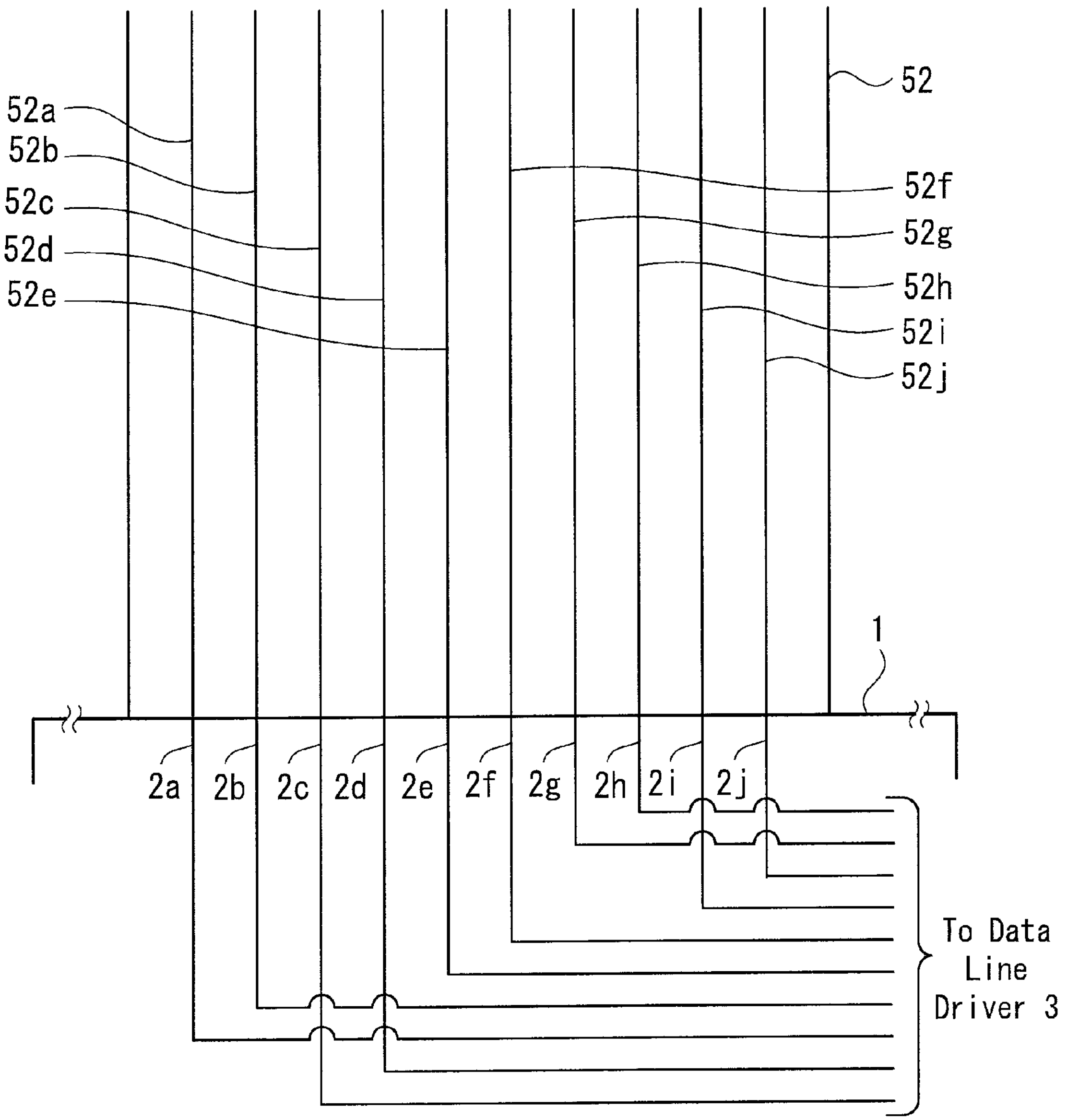
FIG. 11 is another example of the interconnect structure of the drive substrate of FIG. 4.

FIG. 11 shows an embodiment in which two pixels are used as a group of pixels. That is, FIG. 11 shows a case where the FPC (Flexible Print Circuit) 53 including 10 signal lines 53*a* to 53*j* and two ground lines located at both ends of the FPC are used for writing 10 adjacent pixels as a unit. Ten signal lines 2*a* to 2*j* are formed on the drive substrate 1 for transmitting the display data to the data line driver 3 via the FPC 53. (In this embodiment, change-over switches are provided to the data line driver 3 for supplying the display data to the data lines Y per 10 data lines instead of providing the change-over switches 4 to 7 shown in FIG. 4 for supplying the display data to the data lines Y per five data lines).

In the connection side of the FPC 53, the signal lines 2*a* to 2*j* are arranged in the order from the left of signal lines 2*a*, 2*b*, 2*c*, 2*d*, 2*e*, 2*f*, 2*g*, 2*h*, 2*i* and 2*j* viewing from the data line driver 3 (more specifically, the signal lines 2*a* to 2*j* are respectively connected to the signal lines 53*a*, 53*b*, 53*c*, 53*d*, 53*e*, 53*f*, 53*g*, 53*h*, 53*i* and 53*j*), the signal lines 2*a* to 2*j* are rearranged as follows viewing from the data line driver 3.

- the signal line 2*a* is relocated from the left end to the third position from the left.
- the signal line 2*b* is relocated from the second to the fourth position from the left.
- the signal line 2*c* is relocated from the third from the left to the left end.
- the signal line 2*d* is relocated from the fourth to the second position from the left.
- the signal line 2*e* remains at the fifth position from the left.
- the signal line 2*f* remains at the sixth position from the left.
- the signal line 2*g* is relocated from the seventh to the ninth position from the left.
- the signal line 2*h* is relocated from the eighth position from the left to the right end.
- the signal line 2*i* is relocated from the ninth to the seventh position from the left.
- the signal line 2*j* is relocated from the right end to the eighth position from the left.

Figure 12A:
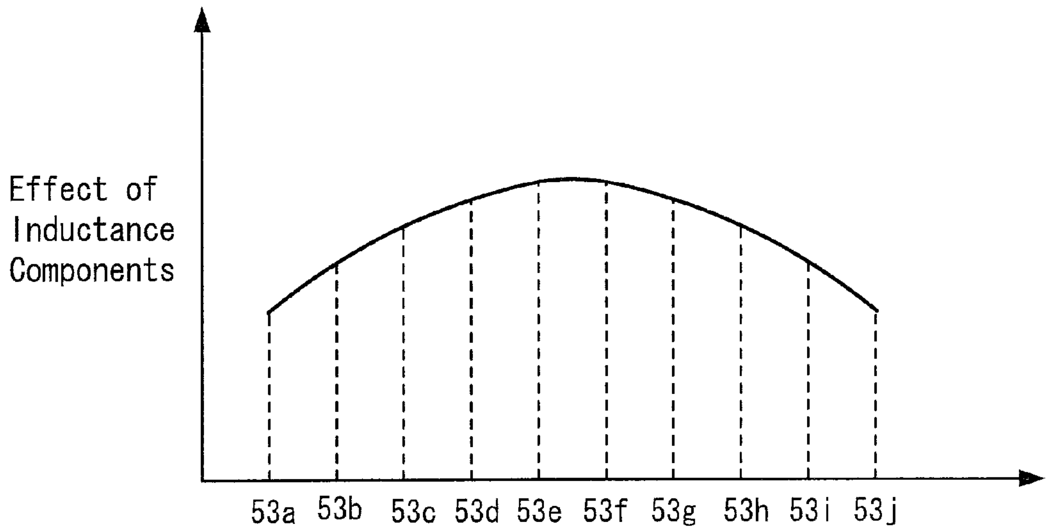
FIGS. 12A and 12B are diagrams showing distribution of levels of the display data due to the interconnect structure of FIG. 11.

FIG. 12A shows distribution representing significance in the effect of the inductance components on respective signal lines 53*a* to 53*j* in the FPC 53. Since the FPC 53 includes two ground lines located at both ends of the FPC 53, the effect of the inductance components on the signal lines gradually becomes larger in the order of the signal lines 53*a*, 53*b*, 53*c*, 53*d*, and 53*e* located closer positions from the end of the FPC 53; and the effect on the signal lines gradually becomes smaller in the order of the signal lines 53*f*, 53*g*, 53*h*, 53*i* and 52*j* located closer positions from the end of the FPC 53. Thus, the distribution includes one positive peak.

However, since the signal lines 2*a* to 2*j* from which the display data are transmitted are rearranged in the drive substrate 1 as described earlier, the display data transmitted via the signal line 53*c* in the FPC 53 are supplied to the pixel at the left end of the adjacent 10 pixels, and the display data transmitted via the signal line 53*d* in the FPC 53 are supplied to the pixel at the second position from left end of the adjacent 10 pixels. Further, the display data transmitted via the signal line 53*a* (signal line having a smaller effect of the inductance components than the signal line 53*c* or 53*d*) in the FPC 53 are supplied to the pixel at the third position from the left, and the display data transmitted via the signal line 53*b* (signal line having a smaller effect of the inductance components than the signal line 53*c* or 53*d*) in the FPC 53 are supplied to the pixel at the fourth position from the left. The display data transmitted via the signal line 53*e* (signal line having a larger effect of the inductance components than the signal line 53*a* or 53*b*) in the FPC 53 are supplied to the pixel at the fifth position from the left, and the display data D9 transmitted via the signal line 53*f* (signal line having a larger effect of the inductance components than the signal line 53*a* or 53*b*) in the FPC 53 are supplied to the pixel at the sixth position from the left. The display data D5 transmitted via the signal line 53*i* (signal line having a smaller effect of the inductance components than the signal line 53*e* or 53*f*) in the FPC 53 are supplied to the pixel at the seventh position from the left, and the display data transmitted via the signal line 53*j* (signal line having a smaller effect of the inductance components than the signal line 53*e* or 53*f*) in the FPC 53 are supplied to the pixel at the eighth position from the left. The display data transmitted via the signal line 53*g* (signal line having a larger effect of the inductance components than the signal line 53*i* or 53*j*) in the FPC 53 are supplied to the pixel at the ninth position from the left, and the display data transmitted via the signal line 53*h* (signal line having a larger effect of the inductance components than the signal line 53*i* or 53*j*) in the FPC 53 are supplied to the pixel at the right end.

Accordingly, the display data via the signal lines having a comparatively larger effect of the inductance components and the display data via the signal lines having a comparatively smaller effect of the inductance components in the FPC 53 are alternately supplied to pixel groups, each of which includes two pixels.

Figure 12B:
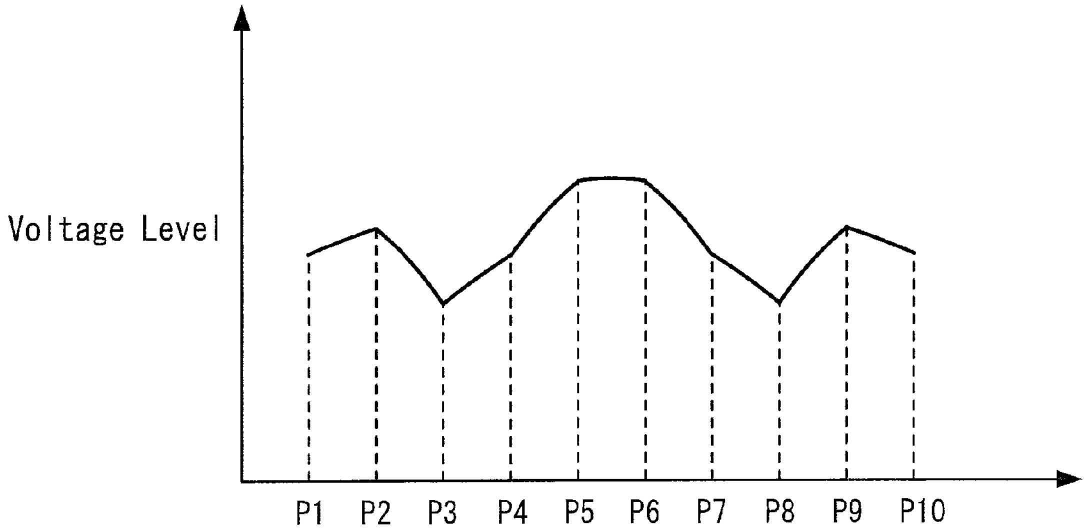

As shown in FIG. 12B, distribution represents the display data supplied to adjacent 10 pixels P1 to P10 described as follows:

the voltage level of the display data supplied to the pixels P3, P4 at the third and fourth positions from the left is lower than that of the display data supplied to the pixels P1, P2 at the left end and the second position from the left;

the voltage level of the display data supplied to the pixels P5, P6 at the fifth and sixth positions from the left is higher than that of the display data supplied to the pixels P3, P4;

the voltage level of the display data supplied to the pixels P7, P8 at the seventh and eighth positions from the left is lower than that of the display data supplied to the pixels P5, P6; and the voltage level of the display data supplied to the pixels P9, P10 at the ninth position from the left and at the right end is higher than that of the display data supplied to the pixels P7, P8. Specifically, the distribution represents not a gradual change in the voltage lever, but represents an increased or decreased voltage level alternately repeated per group of two pixels.

Consequently, with the 10 pixels P1 to P10, though not shown in the figure, a luminance non-uniformity pattern that appears one positive peak with the horizontal width of 10 pixels is not observed, but a luminance non-uniformity pattern that alternately and repeatedly appears light or dark luminance per two pixels is observed. Specifically, a spatial frequency may be increased to the extent that the spatial frequency can little be observed, or cannot be observed with human eyes.

As a result, luminance non-uniformity appeared due to the inconsistent effects of the inductance components in the interconnect material may be reduced to such an extent that the luminance non-uniformity can little be observed or cannot be observed by human eyes without changing the current drive capability of the driver or reducing the length of the interconnect material.

Figure 13:
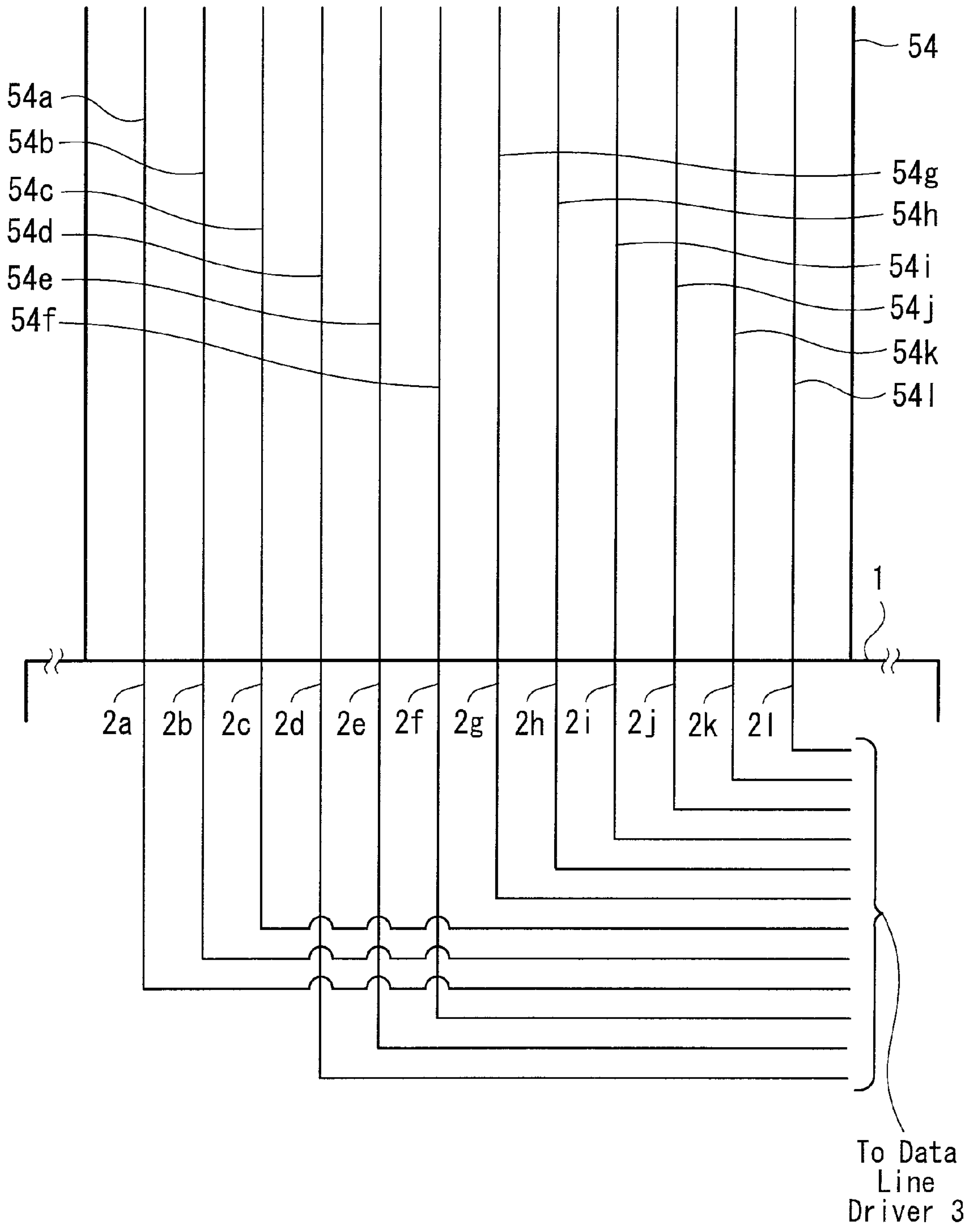
FIG. 13 is another example of the interconnect structure of the drive substrate of FIG. 4.

Subsequently, FIG. 13 shows an embodiment including the aforementioned pixel groups, each of which includes three pixels, in a case where the pixel P in FIG. 4 displays red, green, blue colors (three primary colors) as a display unit of three pixels. That is, FIG. 13 shows a case where the FPC (Flexible Print Circuit) 54 including 12 signal lines 54*a* to 54*l* and two ground lines located at both ends of the FPC are used for writing 12 adjacent pixels as a unit. The display data of RGB for three pixels that includes the same unit of the display is transmitted from the signal lines 54*a* to 54*c*. Similarly, the display data of RGB for three pixels that includes the same unit of the display is transmitted from the signal lines 54*d* to 54*f*, 54*g* to 54*i*, and 54*j* to 54*l*, respectively. Twelve signal lines 2*a* to 2*l* are formed on the drive substrate 1 for transmitting display data to the data line driver 3 via the FPC 54. (In this example, change-over switches are provided to the data line driver 3 for supplying the display data to the data lines Y per 12 data lines instead of providing the change-over switches 4 to 7 shown in FIG. 4 for supplying the display data to the data lines Y per five data lines).

In the connection side of the FPC 54, the signal lines 2*a* to 2*l* are arranged in the order from the left of signal lines 2*a*, 2*b*, 2*c*, 2*d*, 2*e*, 2*f*, 2*g*, 2*h*, 2*i* 2*j*, 2*k* and 2*l* viewing from the data line driver 3 (more specifically, the signal lines 2*a* to 2*j* are respectively connected to the signal lines 54*a*, 54*b*, 54*c*, 54*d*, 54*e*, 54*f*, 54*g*, 54*h*, 54*i*, 54*j*, 54*k* and 54*l*), the signal lines 2*a* to 2*l* are rearranged as follows viewing from the data line driver 3.

the signal line 2*a* is relocated from the left end to the fourth position from the left.

the signal line 2*b* is relocated from the second to the fifth position from the left.

the signal line 2*c* is relocated from the third to the sixth position from the left.

the signal line 2*d* is relocated from the fourth position from the left to the left end.

the signal line 2*e* is relocated from the fifth to the second position from the left.

the signal line 2*f* is relocated from the sixth to the third position from the left.

the signal line 2*g* remains at the seventh position from the left.

the signal line 2*h* remains at the eighth position from the left.

the signal line 2*i* remains at the ninth position from the left.

the signal line 2*j* remains at the tenth position from the left.

the signal line 2*k* remains at the eleventh position from the left.

the signal line 2*l* remains at the right end.

Figure 14A:
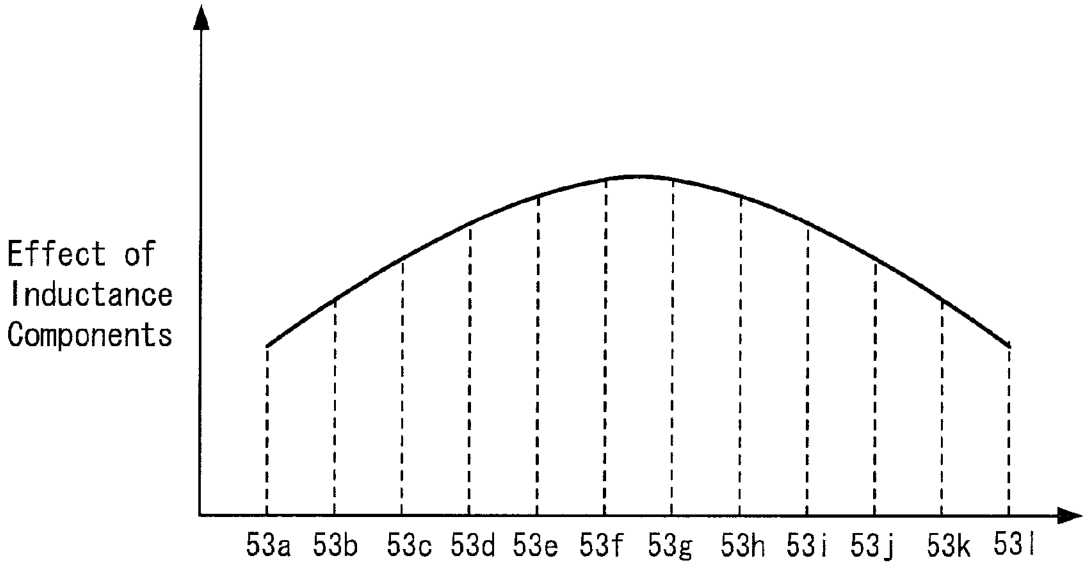
FIGS. 14A and 14B are diagrams showing distribution of levels of the display data due to the interconnect structure of FIG. 13.

FIG. 14A shows distribution representing significance in the effect of the inductance components on respective signal lines 54*a* to 54*l* in the FPC 54. Since the FPC 54 includes two ground lines located at both ends of the FPC 54, the effect of the inductance components on the signal lines gradually becomes larger in the order of the signal lines 54*a*, 54*b*, 54*c*, 54*d*, 54*e* and 54*f* located closer positions from the end of the FPC 54; and the effect on the signal lines gradually becomes smaller in the order of the signal lines 54*g*, 54*h*, 54*i*, 54*j*, 54*k* and 54*l* located closer positions from the end of the FPC 54. Thus, the distribution includes one positive peak.

However, since the signal lines 2*a* to 2*l* from which the display data are transmitted are rearranged in the drive substrate 1 as described earlier, the display data transmitted via the signal line 54*d* to 54*f* in the FPC 54 are supplied to the three pixels (RGB display unit) at the first to the third positions from the left. The display data transmitted via the signal lines (signal line having a smaller effect of the inductance components than the signal lines 54*d* to 54*f*) in the FPC 54 are supplied to the three pixels (RGB display unit) at the fourth to sixth positions from the left. The display data transmitted via the signal lines 54*g* to 54*i* (signal lines having a larger effect of the inductance components than the signal lines 54*d* to 54*f*) in the FPC 54 are supplied to the three pixels (RGB display unit) at the seventh to ninth positions from the left. The display data transmitted via the signal lines 54*j* to 54*l* (signal lines having a smaller effect of the inductance components than the signal lines 54*g* to 54*i*) in the FPC 54 are supplied to the three pixels (RGB display unit) at the tenth to twelfth positions from the left.

Accordingly, the display data via the signal lines having a comparatively larger effect of the inductance components and the display data via the signal lines having a comparatively smaller effect of the inductance components in the FPC 54 are alternately supplied to a pixel group forming a display unit of red, green, and blue colors (RGB).

Figure 14B:
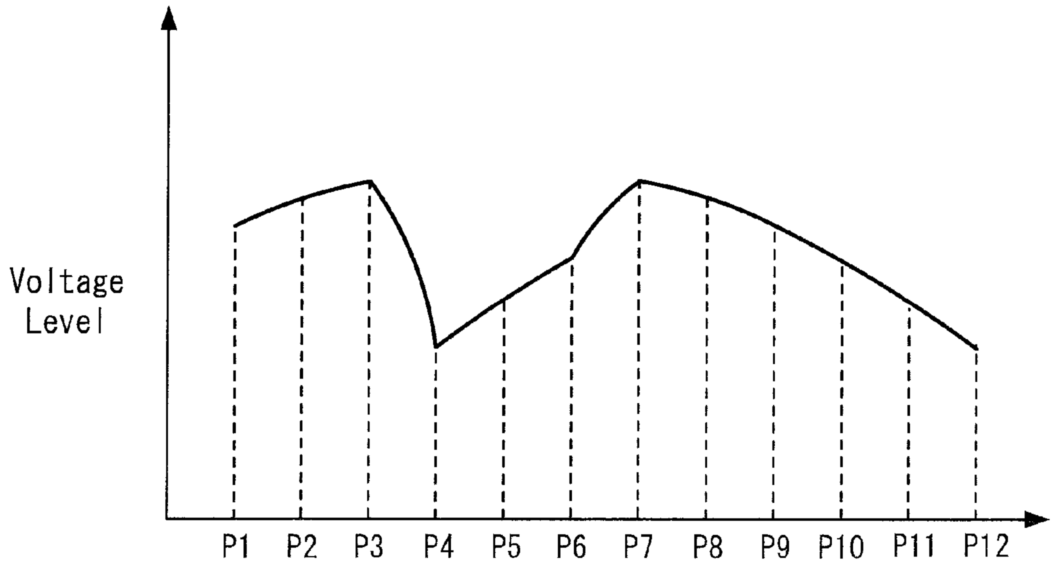

As shown in FIG. 14B, distribution represents the display data supplied to adjacent 12 pixels P1 to P12 described as follows:

the voltage level of the display data supplied to the three pixels P4 to P6 (RGB display unit) at the fourth to sixth positions from the left is lower than that of the display data supplied to the three pixels P1 to P3 (RGB display unit) at the first to the third positions from the left;

the voltage level of the display data supplied to the three pixels P7 to P9 (RGB display unit) at the seventh to the ninth positions from the left is higher than that of the display data supplied to the pixels P4 to P6 (RGB display unit); and the voltage level of the display data supplied to the three pixels P10 to P12 (RGB display unit) at the 10th and 12th positions from the left is lower than that of the display data supplied to the pixels P7 to P9 (RGB display unit). Specifically, the distribution represents not a gradual change in the voltage lever, but represents an increased or decreased voltage level alternately repeated per group of three pixels (RGB display unit).

Consequently, with the 12 pixels P1 to P12, though not shown in the figure, a luminance non-uniformity pattern that appears one positive peak with the horizontal width of 12 pixels is not observed, but a luminance non-uniformity pattern that alternately and repeatedly appears light or dark luminance per three pixels is observed. Specifically, a spatial frequency may be increased to the extent that the spatial frequency can little be observed, or cannot be observed with human eyes.

As a result, luminance non-uniformity appeared due to the inconsistent effects of the inductance components in the interconnect material may be reduced to such an extent that the luminance non-uniformity can little be observed or cannot be observed by human eyes without changing the current drive capability of the driver or reducing the length of the interconnect material.

In addition, the embodiment of the present invention may be applied to the reflective liquid crystal display device using a dot sequential drive system. However, the embodiment of the present invention may not be limited to the reflective liquid crystal display device using a dot sequential drive system. The embodiment of the present invention may also be applied to a reflective liquid crystal display device using a line sequential drive system or a transmissive liquid crystal display device. Further, the embodiment of the present invention may also be applied to a display device using an analog drive system (field electron emission display device (FED), an organic EL display device, and an inorganic EL display device) other than the liquid crystal display device. Furthermore, the embodiment of the present invention may be applied to a display device using a digital drive system to which PAM (Pulse-Amplitude Modulated) display data are supplied. Further, in a case that the embodiment of the present invention may be applied to a display device having a structure where a rearrangement of signal lines is difficult, a substrate (e.g., multi-layer substrate) is interposed between the display device and a flexible print circuit and the plurality of signal lines from which the display data are transmitted are rearranged, the signal lines can easily be rearranged regardless of the structure of the own display device.

As shown in the embodiment of FIG. 4, the display data are supplied from the driver IC 61 through the FPC 51. However, the inconsistent effects of the inductance components may be observed in an interconnect material having a plurality of signal lines disposed in parallel other than that used in the flexible print circuit (e.g., flexible flat cable (FFC)). Therefore, the embodiment of the present invention may be applied to such a case that the display data are supplied from a driver IC via an interconnect material having the plurality of signal lines disposed in parallel other than that used in the flexible print circuit.

Further, in FIG. 8 shows, the embodiment of the present invention is applied to the liquid crystal projector. However, the interconnect structure according to the embodiment of the present invention can be applied not only to the projection system such as the liquid crystal projector but also to various display devices such as television receivers, monitors of personal computers, head mounted displays, viewfinders of video cameras and digital cameras, and displays of cellular phones and information terminal apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An interconnect structure for a display device comprising:

a driver having output terminals from which display data are supplied, and an interconnect material having a plurality of signal lines disposed in parallel through which the display data are supplied from the driver, wherein, a sequential arrangement of the display data at the output terminals is different than a sequential arrangement of the display data of the interconnect material, the signal lines from which the display data are transmitted via the interconnect material are arranged in the interconnect material such that the display data via the signal lines having a comparatively larger effect of the inductance components and the display data via the signal lines having a comparatively smaller effect of the inductance components in the interconnect material are alternately supplied to adjacent pixels or groups of pixels of the display device so that an image is displayed based on the luminance suitable for the display data, and the arrangement of the signal lines in the interconnect material is such that adjacent signal lines transmit the display data from the same driver.

2. The interconnect structure for a display device according to claim 1, wherein the signal lines used for transmitting the display data are arranged such that the display data via the signal lines having a comparatively larger effect of the inductance components in the interconnect material and the display data via the signal lines having a comparatively smaller effect of the inductance components in the interconnect material are alternately supplied to adjacent pixels or groups of pixels.

3. The interconnect structure for a display device according to claim 1, further comprising:

a substrate interposed between the display device and the interconnect material, wherein the signal lines used for transmitting the display data are arranged such that the display data via the signal lines having a comparatively larger effect of the inductance components in the interconnect material and the display data via the signal lines having a comparatively smaller effect of the inductance components in the interconnect material are alternately supplied to adjacent pixels or groups of pixels.

4. The interconnect structure for a display device according to claim 1, wherein the group of pixels includes three pixels forming a display unit of red, green, and blue colors.

5. The interconnect structure for a display device according to claim 1, wherein the plurality of signal lines from which the display data are transmitted to the interconnect material are rearranged between the driver and the interconnect material such that the same display data as the display data used without rearranging the signal lines are supplied to respective pixels.

6. The interconnect structure for a display device according to claim 1, wherein the plurality of signal lines from which the display data are transmitted to the interconnect material are rearranged within the driver such that the same display data as the display data used without rearranging the signal lines are supplied to respective pixels.

7. The interconnect structure for a display device according to claim 1, wherein the display device is a liquid crystal display device which includes a transparent substrate having transparent electrodes thereon facing a drive substrate having pixel electrodes in a matrix form thereon, with liquid crystal being interposed between the two substrates.

8. The interconnect structure for a display device according to claim 6 or 7, wherein the liquid crystal display device is a liquid crystal display device with an active matrix drive system which employs a silicon substrate including a plurality of metal layers formed thereon as the drive substrate, and the plurality of signal lines are arranged such that some of the signal lines are formed so as not to interfere with other signal lines using the plurality of the metal layers.

9. The interconnect structure for a display device according to claim 1, wherein the display device is a field electron emission display device which includes an anode substrate having a fluorescent material applied thereon facing a cathode substrate having a field electron emission element, with a vacuum being formed between the two substrates while retaining with a spacer.

10. The interconnect structure for a display device according to claim 1, wherein the display device is an organic electroluminescence display device which includes a transparent substrate having transparent electrodes thereon facing a drive substrate having pixel electrodes in a matrix form thereon, with an organic electroluminescence material being interposed between the two substrates.

11. The interconnect structure for a display device according to claim 1, wherein the display device is an inorganic electroluminescence display device which includes a transparent substrate having transparent electrodes thereon facing a drive substrate having pixel electrodes in a matrix form thereon, with an inorganic electroluminescence material being interposed between the two substrates.

12. A projection display apparatus comprising:

an optical modulation device which is irradiated with light emitted from a light source and modulates the light based on display data using the optical modulation device, wherein, the optical modulation device is used for a display device to which the display data are supplied from output terminals of a driver via an interconnect material having a plurality of signal lines disposed in parallel and displays an image having suitable luminance based on the levels of the display data, a sequential arrangement of the display data at the output terminals is different than a sequential arrangement of the display data of the interconnect material, the signal lines from which the display data are transmitted via the interconnect material are arranged in the interconnect material such that the display data via the signal lines having a comparatively larger effect of the inductance components and the display data via the signal lines having a comparatively smaller effect of the inductance components in the interconnect material are alternately supplied to adjacent pixels or groups of pixels of the optical modulation device, and the arrangement of the signal lines in the interconnect material is such that adjacent signal lines transmit the display data from the same driver.

* * * * *